(12) United States Patent
Lau et al.

(10) Patent No.: US 11,361,177 B2
(45) Date of Patent: Jun. 14, 2022

(54) COMPOSITE INFORMATION BEARING DEVICES

(71) Applicant: INFOTOO INTERNATIONAL LIMITED, Hong Kong (HK)

(72) Inventors: Tak Wai Lau, Hong Kong (HK); Wing Hong Lam, Hong Kong (HK)

(73) Assignee: INFOTOO INTERNATIONAL LIMITED, Hong Kong (HK)

( * ) Notice: Subject to any disclaimer, the term of this patent is extended or adjusted under 35 U.S.C. 154(b) by 0 days.

(21) Appl. No.: 16/244,086

(22) Filed: Jan. 9, 2019

(65) Prior Publication Data
US 2019/0163944 A1 May 30, 2019

Related U.S. Application Data

(63) Continuation-in-part of application No. 15/105,658, filed as application No. PCT/IB2014/066991 on Dec. 17, 2014, now abandoned.

(30) Foreign Application Priority Data

Dec. 17, 2013 (HK) .................................. 13113992.6

(51) Int. Cl.
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
CPC ............. G06K 7/10722; G06K 7/1417; G06K 19/06037; G06K 19/06056; G06K 19/06103; G06K 19/14
See application file for complete search history.

(56) References Cited

U.S. PATENT DOCUMENTS

| 6,369,919 | B1 * | 4/2002 | Drinkwater | G03H 1/265 283/86 |
| 9,659,201 | B2 * | 5/2017 | Yoshida | G06K 7/1456 |
| 9,704,081 | B2 * | 7/2017 | Tanaka | G06K 1/12 |
| 2009/0255992 | A1 * | 10/2009 | Shen | G06T 11/60 235/462.1 |
| 2012/0286031 | A1 * | 11/2012 | Rothschild | G06K 19/06056 235/375 |

(Continued)

OTHER PUBLICATIONS

Baharav . "Visually significant QR codes: Image blending and statistical analysis." 2013 IEEE International Conference on Multimedia and Expo (ICME). IEEE, Jul. 2013. (Year: 2013).*

*Primary Examiner* — Katrina R Fujita

(57) ABSTRACT

A composite information bearing device comprising an image pattern and a human readable data device. The human readable data device includes a set of human readable data symbols representing a first set of data. The first set of data includes a first data portion and a second data portion. The image pattern represents a second set of data and comprises a third data portion. One of the first or said second data portions is to form an identification code upon combination or concatenation with said third data portion, and the other one of said first or said second data portions not forming part of said identification code is to form a verification code, the verification code being related to said identification code by a scheme of operation.

20 Claims, 10 Drawing Sheets

(56) References Cited

U.S. PATENT DOCUMENTS

| | | | |
|---|---|---|---|
| 2013/0215473 A1* | 8/2013 | Fan | G06K 19/06103 358/3.28 |
| 2013/0228629 A1* | 9/2013 | Fan | G06K 19/06103 235/494 |
| 2013/0301870 A1* | 11/2013 | Mow | G06T 1/0064 382/100 |
| 2014/0105449 A1* | 4/2014 | Caton | G06F 21/34 382/100 |
| 2014/0173695 A1* | 6/2014 | Valdivia | G06F 21/33 726/4 |
| 2016/0019407 A1* | 1/2016 | Yoshida | G06K 19/06075 235/437 |
| 2016/0042262 A1* | 2/2016 | Tanaka | G06K 19/06056 235/494 |
| 2016/0092760 A1* | 3/2016 | Tanaka | G06K 7/1443 382/180 |

\* cited by examiner

COMPOSITE INFORMATION BEARING DEVICES

The present application is a continuation-in-part application of U.S. Ser. No. 15/105,658 which was filed on Jun. 17, 2016 as a national phase entry of PCT/IB2014/066991, filed on Dec. 17, 2014, and claimed priority from a patent application of Hong Kong SAR filed on Dec. 17, 2013.

Information bearing devices can be useful sources of information. An information bearing device may comprise human perceivable signs and/or human non-perceivable signs. Road signs, pictures of animals, national flags, words, alphanumeric characters, non-alphanumeric characters such as Asian or Arabic characters, are example of human perceivable signs. Barcodes, QR codes, scrambled codes, watermarks, and transform domain images are example of non-human perceivable signs.

The human culture is substantially founded on human readable signs, and human readable signs are primarily built of human readable symbols such as alphanumerical characters, non-alphanumerical characters, Latin or non-Latin characters, Asian characters, Greek, Arabic or Egyptian symbols, in ASCII, Unicode or otherwise, or a combination thereof.

While human readable signs provide useful information to the human reader, there are occasions where information is stored in information bearing devices comprising human non-perceivable signs. The use of human non-perceivable signs in information bearing devices may be to hide information from human readers, to facilitate machine reading of information, or a combination of both. For example, manufacturer's information or costing information of products may be hidden from the public by embedding them in a machine coded pattern alongside human perceivable information such as price, materials, products identification information, size, etc. on a tag attached to a product.

As image capturing devices capable of capturing digital images of a high image resolution are readily available due to the increasing popularity of smart phones, human non-perceivable signs in the form of machine coded images are increasingly useful for combating counterfeiting.

DESCRIPTION OF FIGURES

The present disclosure will be described by way of examples with reference to the accompanying Figures, in which:—

DESCRIPTION

Figure 1A:
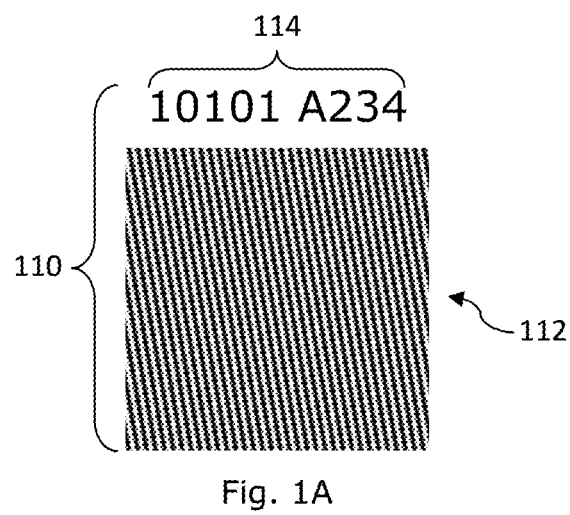
FIG. 1A is a schematic diagram depicting an example composite information bearing device.

A composite information bearing device of the present disclosure comprises a composite of an image pattern and a human readable data device. The human readable data device comprises a set of human readable data symbols corresponding to a first set of data. The human readable data device that constitutes the first set of data may be divided into a first data portion and a second data portion. Human readable symbols herein includes alphanumerical characters, non-alphanumerical characters, Latin and non-Latin characters, Asian characters, Greek, Arabic or Egyptian symbols, in ASCII, Unicode, mathematical symbols, other signs or symbols that are human readable, and a combination thereof.

Each image pattern comprises a plurality of image defining elements which collectively define the image pattern. The image pattern is to correspond to or represent a second set of data, and the second set of data comprises a third data portion. The image pattern may be human perceivable or non-human perceivable. A human perceivable image pattern is one which conveys readable information to a human reader by human perception. National flags, shape of well-known figures, shape of known animals, shape of known articles or devices, etc. are example of human perceivable image patterns. A non-human perceivable image pattern is one which does not convey readable information to a human reader by human perception. An example of non-human perceivable image pattern is machine coded image pattern such as machine scrambled images or machine decomposed images of data. The machine coded images may be generated by steganography techniques such as transform domain techniques. Machine coded images are useful for application in information bearing devices since a machine coded image can be digitally processed for reversal to the data it represents through reversal operation of machines such as microprocessors.

The image pattern may comprise a machine coded image or a combination of machine coded images. The combination may be superposition or superimposition. Each of the machine coded image is machine readable and machines translatable into the data it represents through operations of processors such as microprocessors on the machine coded image by a reversal process.

Each of the machine coded image may correspond to or may correlate to the data it represents by a scheme of operation such as a scheme of steganography. The scheme of steganography may be a scheme of machine or processor operation. The scheme of steganography is to operate to decompose or break a data symbol into a plurality of image defining elements which are distributed, scattered or spread within a boundary of the machine coded image to collectively define the image pattern. The data is to be recovered or recomposed through reversal operation of the scheme of steganography on the image pattern, for example through reversal operation of the plurality of image defining elements of the image pattern. Example schemes of steganography which have the above properties include schemes of mathematical operation based on transform domain techniques.

Where the image pattern is a digital image represented or representable by a total of N× M pattern defining elements, where N and M are integer numbers, a processor is to process the N×M pattern defining elements to compose or recomposes the data to which the image pattern correlates. In some embodiments, the image pattern is represented or for representation in a matrix comprising of N×M pattern defining elements arranged in N rows and M columns. For most mobile applications, an image pattern having N≤500 and M≤500 would be sufficient. The image pattern may be arranged as a square matrix of pixels such that N=M, for example N=M=377 for a smartphone with a 5-megapixel camera.

Where the image pattern is a matrix of N row and M columns, there will be a total of N× M number of image defining elements. The image defining elements are distributed within the boundary of the image in a scrambled or spread around manner to collectively define a third data portion.

In some embodiments, the image pattern is to represent a check code. A check code is also referred to herein as a verification code. A check code or a verification code herein may comprise a verification data or a set of verification data where appropriate. In those embodiments, the third data portion represented by the image pattern is to correspond to or represent a check code. The check code may be represented by an n-bit binary data as a convenient example. The n-bit binary data representation means that the check code can be one of $2^n$ possibilities.

In some embodiments, the image pattern is to represent part of target data such as an identification code. The image pattern may be represented by an n-bit binary data as a convenient example. The n-bit binary data representation means that the target data can be one of $2^n$ possibilities.

As image patterns corresponding to machine coded image patterns may represent many possibilities of coded or encrypted data or messages, composite information bearing devices comprising such image patterns are useful to facilitate the formation of coded identification devices.

Currently, machine coded image patterns having very fine and complicated details packed at a very high density are applied on labels or tags to form tools against counterfeiting. Such machine coded image patterns are usually applied on the labels or tags by offset printing and rotary machine printing. The use of off-set printing technology would mean that a master pattern of very high precision has to be engraved on a zinc plate for subsequent transfer to a sheet of medium on which the pattern is to reside. Likewise, the use of rotary machine printing would mean that a master pattern of very high precision has to be embedded on a cylindrical plate for subsequent transfer to a roll of medium on which the pattern is to reside. The requirement of such a pre-patterned plate to form a machine coded image pattern would mean that labels or tags bearing such machine coded image patterns would not be suitable for use in applications where a large number of identification means each having an individual or unique identity is required. While such image patterns can of course be made by other high precision image formation methods or machines, the overheads, whether time, costs, or otherwise, associated with the making of such image patterns make it less attractive for large scale applications such as for application in consumer goods.

Where a single machine coded image pattern is to form an identification part or identification portion of a plurality of composite information bearing devices such that each of the composite information bearing devices is to have a unique or distinct identity, the costs or overheads associated with the production of each such composite information bearing devices can be substantially reduced due to costs sharing or splitting. The cost benefits will be more apparent when the number of distinctive composite information bearing devices having a same machine coded image pattern increases.

Moreover, a large number of distinctive composite information bearing devices sharing a single or common machine coded image pattern which forms an identification part or portion of the composite information bearing device would facilitate the use of template matching for more expedient detection and determination of the common machine coded image pattern. Templates of such machine coded image patterns may be pre-stored and retrieved by a processor for subsequent detection or verification of a target machine coded image pattern.

The identity of a composite information bearing device may comprise an identification code and a verification code for verifying the identification code. The common machine coded image pattern may form part of the identification code, for example, a more or the most significant portion of the identification code. The common machine coded image pattern may form part of the verification code, for example, a more or the most significant portion of the verification code without loss of generality. At a minimum, the composite information bearing devices of the present disclosure provides the public with a useful choice.

An example composite information bearing device 110 depicted in FIG. 1A comprises a machine coded image pattern 112 and a human readable data device 114. The image pattern 112 represents a check digit "1". The human readable device 114 comprises a string of alphanumerical characters "10101 A234".

Figure 1B:
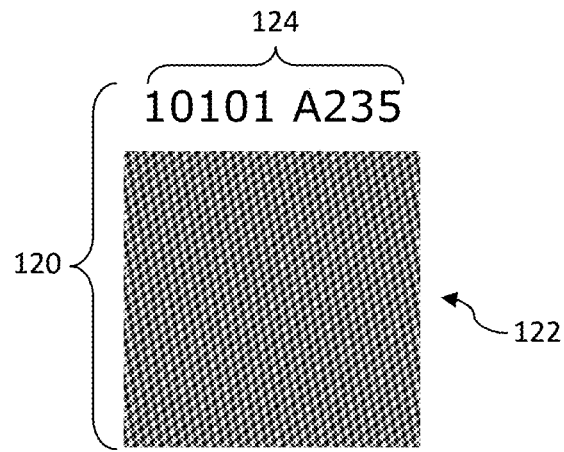
FIG. 1B is a schematic diagram depicting another example composite information bearing device.

An example composite information bearing device 120 depicted in FIG. 1B comprises a machine coded image pattern 122 and a human readable data device 124. The image pattern 122 represents a check code "9". The human readable device 124 comprises a string of alphanumerical characters "10101 A235".

Figure 1C:
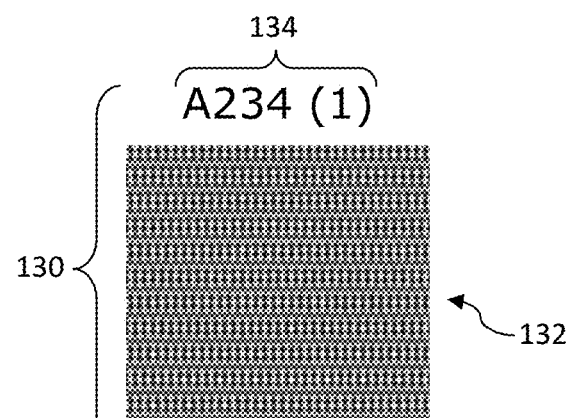
FIG. 1C is a schematic diagram depicting another example composite information bearing device.

An example composite information bearing device 130 depicted in FIG. 1C comprises a machine coded image pattern 132 and a human readable data device 134. The image pattern 132 represents a binary data string "10101". The human readable device 134 comprises a string of alphanumerical characters "A234 (1)".

Figure 1D:
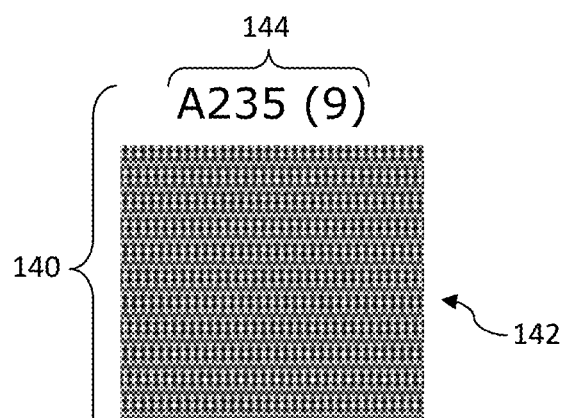
FIG. 1D is a schematic diagram depicting another example composite information bearing device.

An example composite information bearing device 140 depicted in FIG. 1D comprises a machine coded image pattern 142 and a human readable data device 144. The image pattern 142 represents a binary data string "10101". The human readable device 144 comprises a string of alphanumerical characters "A235 (9)".

Figure 1E:
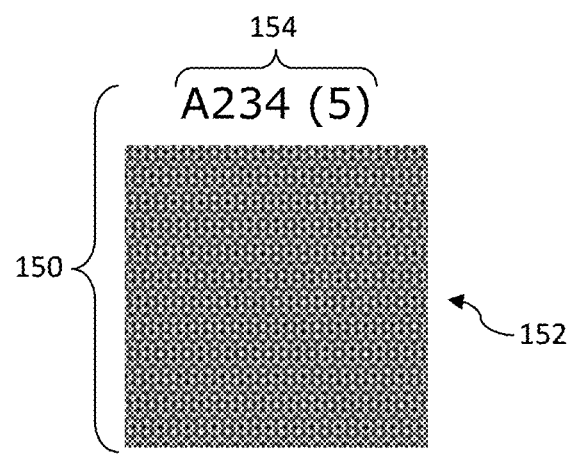
FIG. 1E is a schematic diagram depicting another example composite information bearing device.

An example composite information bearing device 150 depicted in FIG. 1E comprises a machine coded image pattern 152 and a human readable data device 154. The image pattern 152 represents a binary data string "11111". The human readable device 154 comprises a string of alphanumerical characters "A234 (5)".

Figure 1F:
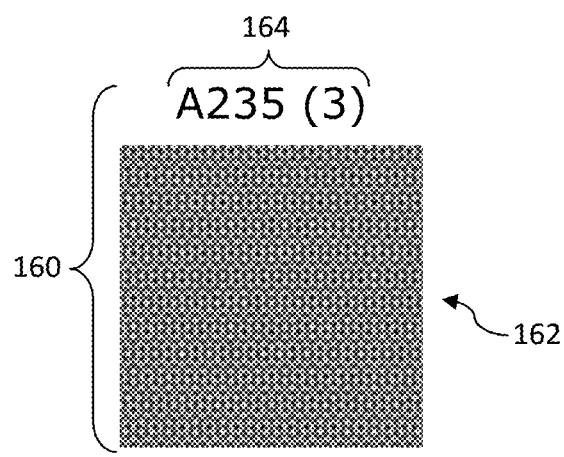
FIG. 1F is a schematic diagram depicting another example composite information bearing device.

An example composite information bearing device 160 depicted in FIG. 1F comprises a machine coded image pattern 162 and a human readable data device 164. The image pattern 162 represents a binary data string "11111". The human readable device 164 comprises a string of alphanumerical characters "A235 (3)".

In each of the example composite information bearing devices of FIGS. 1A to 1F, the human readable data device of each device is to represent a first set of data and the machine coded image pattern is designed to represent a second set of data. The first and second sets of data are to define a set of data comprising a target data and a verification data for verifying the target data.

In the example of FIG. 1A, the alphanumerical characters "10101 A234" of the human readable device 114 is a target data while the check digit "1" is a verification data.

In the example of FIG. 1B, the alphanumerical characters "10101 A235" of the human readable device 124 is a target data while the check digit "9" is a verification data.

The target data is a variable and may represent a serial number, identification number, or other identification means.

In the example of FIG. 1C, a portion of the human readable device 134, namely, the leading portion "A234" of the alphanumerical string represents a first portion of a target data. Another portion of the human readable device 134, namely (1), is a verification data representing a check digit "1". The machine coded image pattern 132 is to represent a binary data string "10101" and this binary data string forms a second portion of the target data. The complete target data "10101 A234" is a combination of the first and second portions of the target data by concatenation.

In the example of FIG. 1D, a portion of the human readable device 144, namely, the leading portion "A235" of the alphanumerical string represents a first portion of a target data. Another portion of the human readable device 144, namely (9), is a verification data representing a check digit "9". The machine coded image pattern 142 is to represent a binary data string "10101" and this binary data string forms a second portion of the target data. The complete target data "10101 A235" is a combination of the first and second portions of the target data by concatenation.

It will be noted that the machine code images 132 and 142 of FIGS. 1C and 1D are the same and are to represent the same target data portion.

Similar to that of FIGS. 1C and 1D, the composite devices of FIGS. 1E and 1F are arranged such that the machine coded image pattern 152, 162 represents the leading portion of the target data, the leading portion of the human readable device 154, 164 represents a trailing portion of the target data, and the trailing portion of the human readable device 154, 164 represents the verification data. In the examples depicted in FIGS. 1E and 1F, the leading portion of the target data as represented by the same coded image pattern 152, 162 is the same and equals "11111". The trailing portion of the target data of FIG. 1E is A234, the complete target data is 11111 A234, and the verification data is 5. The trailing portion of the target data of FIG. 1F is A235, the complete target data is 11111 A235, and the verification data is 3.

In the example of 1C, 1D, 1E &1F, the data represented by the machine coded image pattern forms part of the target data or part of the identification code. This arrangement means that the same machine coded image can form part of a plurality of composite information bearing devices, with each composite information bearing device having its own or unique identity. Such an arrangement is advantageous since it facilitates the use of more sophisticated machine coded image patterns with a higher degree of complexity can be generated with a higher degree of resolution for multiple uses.

For the sake of completeness, the example relationship between the complete target data and the verification data may be by a scheme of operation, such as a scheme of computational operation by way of an example hash map as below.

TABLE 1

| Based on Luhn Algorithm | | Based on Arbitrary Hashing | |
| --- | --- | --- | --- |
| string | Check code | string | Check code |
| 10101A234 | 1 | A123456 | 3 |
| 10101A235 | 9 | A123457 | 3 |
| 11111A234 | 5 | A123410101 | 4 |
| 11111A235 | 3 | 11111B235 | 2F |
| 111118239 | 5 | 10101246813 | 567 |
| ... | ... | ... | ... |

A hash map provides convenient on-line access as the database of hash maps can be conveniently generated on-line. In some embodiments, the check code may be a set of verification data which is generated by other schemes of operations such as the Luhn algorithm (a.k.a. modulus 10) or a hash-based message authentication code.

An example verification data generated by the Luhn algorithm using a semantic symbol containing the data string of 10101 A234 of the device 114 is depicted in the table below:

TABLE 2

| Semantic Symbol | Value | Position Weight | Weighted Value |
| --- | --- | --- | --- |
| 1 | 1 | 10 | 1 * 10 = 10 |
| 0 | 0 | 9 | 0 * 9 = 0 |
| 1 | 1 | 8 | 1 * 8 = 8 |
| 0 | 0 | 7 | 0 * 7 = 0 |

TABLE 2-continued

| Semantic Symbol | Value | Position Weight | Weighted Value |
|---|---|---|---|
| 1 | 1 | 6 | 1 * 6 = 6 |
| A | 10 | 5 | 10 * 5 = 50 |
| 2 | 2 | 4 | 2 * 4 = 8 |
| 3 | 3 | 3 | 3 * 3 = 9 |
| 4 | 4 | 2 | 4 * 2 = 8 |
| Q | Q | 1 | Q * 1 = Q |

Sum of weighted value of all the semantic symbols = 99 + Q;

Assuming that a modulus 10 scheme is used, the check code Q generated with reference to the total weighted sum (99+Q) is given by (99+Q) mod 10=0 operation, which would mean the check code Q having a value of 1.

As the image pattern of a composite information bearing device is devised to represent a set of information bearing data, each image pattern is characteristic of the information data it represents. Therefore, the image pattern of a composite information bearing device is also a signature pattern or a unique corresponding pattern of the information data it represents.

Digital steganographic techniques such as transform domain techniques are useful tools for generating signature image patterns or unique corresponding image patterns in a systematic manner. Digital steganographic techniques such as digital steganography of images are capable of hiding or encoding data in an image pattern by a scheme of steganography such as a scheme of mathematical operation or a scheme of computational operation. The capability to hide or encode data in an image pattern by a scheme of steganography is useful for generating signature image patterns or unique corresponding image patterns since the hidden or encoded data can be recovered by machine decoding through a reversal of the scheme of encoding or hiding operations.

Example transform domain techniques that are useful to hide data in an image pattern include those that can operate to decompose or spread a single data symbol into a plurality of image defining elements of an image pattern, and to recover or re-compose the hidden data through a scheme of reversal operation. In the present context, the term 'hide data' and its literal equivalent terms such as 'hiding data' or 'hidden data' shall be given corresponding equivalent meanings to the term 'encode data' and its literal equivalent terms such as 'encoding data', 'encoded data' where the context allows or permits. Fourier Transform, Bessel Transform, Cosine Transform are examples of such transform domain techniques. Where the image patterns are digital images, discrete forms of such transform domain techniques such as Discrete Fourier Transform (DFT), Fast Fourier Transform (FFT), Discrete Bessel Transform, Discrete Cosine Transform, etc. would be especially useful.

For an image having an image size of N×M pixels in the spatial domain, where N is the number of rows and M is the number of pixels in a row or the number of columns, an image defining element f(x,y) is related to the data points F(u,v) in the Fourier domain as follows:

$$f(x, y) = T^{-1}(F(u, v)) = \sum_{u=-N/2}^{\frac{N}{2}-1} \sum_{v=-M/2}^{\frac{M}{2}-1} F(u, v)\exp\left(-\frac{j2\pi ux}{N}\right)\exp\left(-\frac{j2\pi vy}{M}\right)$$

A data point in the Fourier domain is related to the properties of the image defining elements f(x,y) in the spatial domain as follows.

$$F(u, v) = \frac{1}{MN} \sum_{x=-N/2}^{\frac{N}{2}-1} \sum_{y=-M/2}^{\frac{M}{2}-1} f(x, y)\exp\left(\frac{j2\pi ux}{N}\right)\exp\left(\frac{j2\pi vy}{M}\right).$$

For the example composite information bearing devices of FIGS. 1C to 1F, the image pattern is required to represent a data which consists of 5 binary digits. In order that a signature image pattern is provided for each of the 31 (that is, $2^5-1$) possibilities, 31 signature image patterns are required and Discrete Fourier Transform is used as an example transform domain technique to devise the signature image patterns. The all-zero data "00000" is not utilized in this example as this corresponds to a null image. For other coding schemes or where appropriate, an all-zero data may be useful.

Where an image is a machine encoded image pattern (represented by f(x,y)) corresponding to one that is due to transform domain operation on a data symbol comprising a plurality of data points, the image may be represented as follows:

$$f(x,y)=T^{-1}(F(u,v))=T^{-1}(p1(u,v)+p2(u,v)+ \ldots +pn(u,v))$$

where p1, p2, . . . , pn are the data points forming the data symbol.

Where the machine encoded image pattern image is due to linear superimposition of image patterns due to transform domain operation on the individual data points, the machine encoded image pattern may also be represented as follows:

$$f(x,y)=T^{-1}(p1(u,v))+T^{-1}(p2(u,v))+ \ldots +T^{-1}(pn(u,v))$$

Fourier Transform and Bessel Transform are examples of such transform domain operations.

5 data points are selected on the Fourier plane to represent these 5 binary data bits. The 5 data bits are designated as (p5, p4, p3, p2, p1), where p5 is the most significant bit and p1 is the least significant bit. The binary data string values represented by these 5 data bits are as follows:

TABLE 3

| P5 | P4 | P3 | P2 | P1 | "value" |
|---|---|---|---|---|---|
| 0 | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| 0 | 0 | 1 | 1 | 0 | 6 |
| 0 | 0 | 1 | 1 | 1 | 7 |
| 0 | 1 | 0 | 0 | 0 | 8 |
| 0 | 1 | 0 | 0 | 1 | 9 |
| 0 | 1 | 0 | 1 | 0 | 10 |
| . | . | . | . | . | . |
| . | . | . | . | . | . |
| . | . | . | . | . | . |
| 1 | 0 | 0 | 0 | 0 | 16 |
| 1 | 0 | 0 | 0 | 1 | 17 |
| 1 | 0 | 0 | 1 | 0 | 18 |
| 1 | 0 | 0 | 1 | 1 | 19 |
| 1 | 0 | 1 | 0 | 0 | 20 |
| 1 | 0 | 1 | 0 | 1 | 21 |
| 1 | 0 | 1 | 1 | 0 | 22 |
| . | . | . | . | . | . |
| . | . | . | . | . | . |
| . | . | . | . | . | . |

TABLE 3-continued

| P5 | P4 | P3 | P2 | P1 | "value" |
|----|----|----|----|----|---------|
| 1  | 1  | 1  | 0  | 1  | 29      |
| 1  | 1  | 1  | 1  | 0  | 30      |
| 1  | 1  | 1  | 1  | 1  | 31      |

On the Fourier plane, the 5 binary data points are distributed with the following (u,v) coordinates as a convenient example and each of the data points has a value of "0" or "1" or, alternatively, "ON" or "Off":

TABLE 4

|    | u   | v  |
|----|-----|----|
| P1 | 34  | 6  |
| P2 | 22  | 27 |
| P3 | 0   | 35 |
| P4 | -22 | 27 |
| P5 | -34 | 6  |

The 5 example binary data points above have the following transform domain functions:

$$p1(u,v) = \begin{cases} 1, & u=34 \text{ and } v=6 \\ 0, & \text{otherwise} \end{cases}$$

$$p2(u,v) = \begin{cases} 1, & u=22 \text{ and } v=27 \\ 0, & \text{otherwise} \end{cases}$$

$$p3(u,v) = \begin{cases} 1, & u=0 \text{ and } v=35 \\ 0, & \text{otherwise} \end{cases}$$

$$p4(u,v) = \begin{cases} 1, & u=-22 \text{ and } v=27 \\ 0, & \text{otherwise} \end{cases}$$

$$p5(u,v) = \begin{cases} 1, & u=-34 \text{ and } v=6 \\ 0, & \text{otherwise} \end{cases}$$

For the composite information bearing device 110 of FIG. 1A, the image pattern is a machine coded image pattern 112 which is coded by Fourier Transform operation on the binary data check code. The binary data check code has the representative value "1", or the value (0,0,0,0,1) when represented in the 5-binary bit data format (p5, p4, p3, p2, p1). As all the p values are zero or "OFF" except for p1 which is "1" or "ON", the image pattern is that due solely to p1 and has the following representation:

$$f(x,y)=T^{-1}(F(u,v))=T^{-1}(p1(u,v))$$

For the composite information bearing device 120 of FIG. 1B, the image pattern is a machine coded image pattern 122 which is coded by Fourier Transform operation on the binary data check code. The binary data check code has the representative value "9", or the value (0,1,0,0,1) when represented in the 5-binary bit data format (p5, p4, p3, p2, p1). As all the p values are zero except for p1 and p4, the image pattern is that due to superimposition of p1 and p4 and has the following representation:

$$f(x,y)=T^{-1}(F(u,v))=T^{-1}(p1(u,v)+p4(u,v))$$

Where the image pattern is a linear superimposition of image patterns of the constituting data points reflecting properties of the transform domain operation, the resultant image pattern is also representable as follows:—

$$f(x,y)=T^{-1}(p1(u,v))+T^{-1}(p4(u,v))$$

For the composite information bearing device 130 of FIG. 1C, the image pattern is a machine coded image pattern 132 which is coded by Fourier Transform operation on the binary data. The binary data has the representative value "21", or the value (1,0,1,0,1) when represented in the 5-binary bit data format (p5, p4, p3, p2, p1). As all the p values are zero or "OFF" except for p1, p3 and p5, the image pattern is that due to superimposition of p1, p3 and p5 and has the following representation:

$$f(x,y)=T^{-1}(F(u,v))=T^{-1}(p1(u,v)+p3(u,v)+p5(u,v))$$

Where the image pattern is a linear superimposition of image patterns of the constituting data points reflecting properties of the transform domain operation, the resultant image pattern is also representable as follows:

$$f(x,y)=T^{-1}(p1(u,v))+T^{-1}(p3(u,v))+T^{-1}(p5(u,v))$$

Figure 2A:
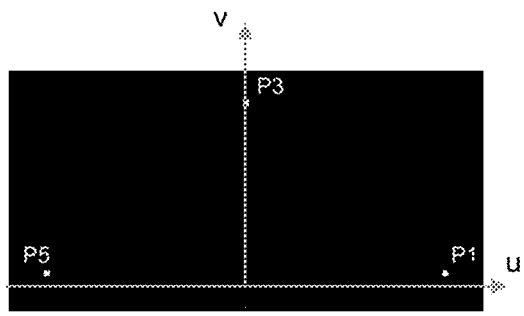
FIG. 2A is a schematic diagram representation of data points on the Fourier plane which are embedded in the machine coded image pattern of FIGS. 1C and 1D.

For the composite information bearing device 140 of FIG. 1D, the machine coded image pattern 142 is identical to that of the machine coded image pattern 132 and the description will apply mutatis mutandis. A representation of the 5-binary bit data format (p5, p4, p3, p2, p1) of the machine coded image pattern 132,142 on the Fourier plane as signal points is depicted in FIG. 2A.

For the composite information bearing device 150 of FIG. 1E, the image pattern is a machine coded image pattern 152 which is coded by Fourier Transform operation on the binary data. The binary data has the representative value "31", or the value (1,1,1,1,1) when represented in the 5-binary bit data format (p5, p4, p3, p2, p1). As all the p values are "1" or "ON", the image pattern is that due to superimposition of all of p1, p2, p3, p4 and p5 and has the following representation:

$$f(x,y)=T^{-1}(p1(u,v)+p2(u,v)+p3(u,v)+p4(u,v)+p5(u,v))$$

Where the image pattern is a linear superimposition of image patterns of the constituting data points due to properties of the transform domain operation, the resultant image pattern is also representable as follows:—

$$f(x,y)=T^{-1}(p1(u,v))+T^{-1}(p2(u,v))+T^{-1}(p3(u,v))+T^{-1}(p4(u,v))+T^{-1}(p5(u,v))$$

For the composite information bearing device 160 of FIG. 1F, the machine coded image pattern 162 is identical to that of the machine coded image pattern 152 and the description will apply mutatis mutandis.

Figure 2B:
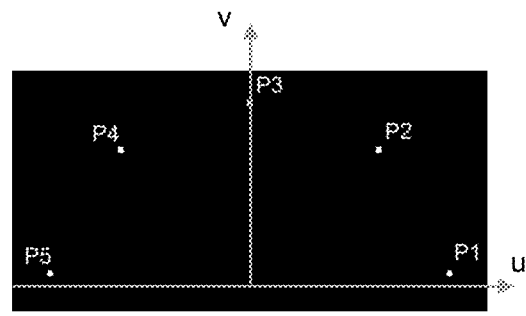
FIG. 2B is a schematic diagram representation of data points on the Fourier plane which are embedded in the machine coded image pattern of FIGS. 1E and 1F.

A representation of the 5-binary bit data format (p5, p4, p3, p2, p1) of the machine coded image pattern 152,162 on the Fourier plane as signal points is depicted in FIG. 2B.

In the examples of FIGS. 1A to 1F, 5 data points, namely, p1-p5 have been selected to provide $2^5-1$ possibilities. It will be appreciated that the number of data points, n, can be increased or decreased according to actual requirements without loss of generality.

Figure 3B:
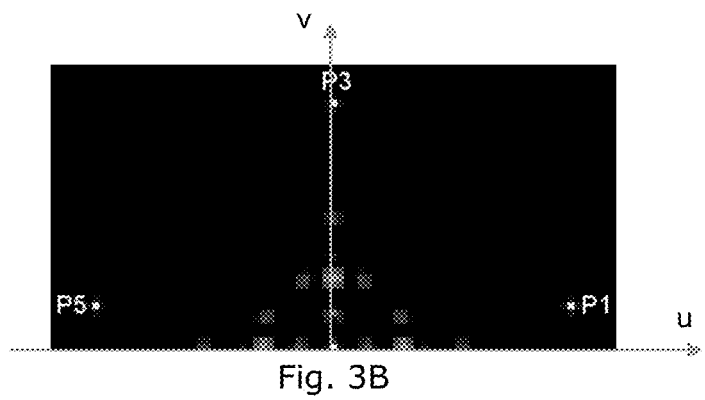
FIG. 3B is a schematic diagram representation of data points on the Fourier plane which are embedded in the machine coded image pattern of FIG. 3A.
Figure 3A:
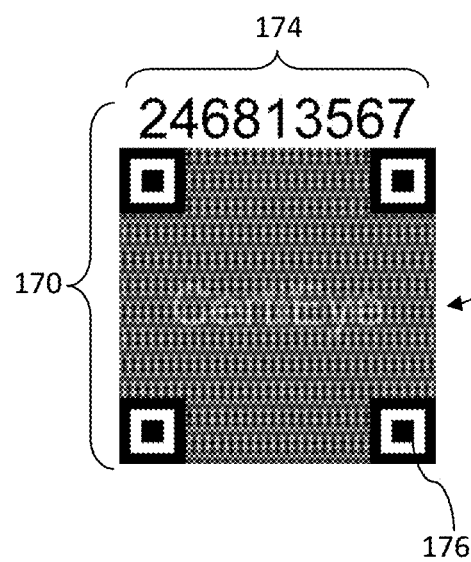
FIG. 3A is a schematic diagram depicting another example composite information bearing device.

A composite information bearing device 170 depicted in FIG. 3A comprises a machine coded image pattern 172 and a human readable device 174. The human readable device 174 comprises an example alphanumeric data string "246813567". The first data portion of the human readable device 174 "246813" forms a complete target data "10101 246813" when combines with the data value "10101" represented by the coded image pattern 172 and the second data portion of the human readable device 174 "567" forms the verification data "567". In addition to the machine coded image pattern 172 and the human readable device 174, this composite information bearing device 170 also comprises an alignment guide and a watermark "CertiEye". The alignment guide is integrally formed on the composite information bearing device 170 to provide alignment assistance when an image of the composite information bearing device 170 is to be captured for analysis. The alignment guide comprises alignment devices 176 which are distributed on far corners of the machine coded image pattern 172. The alignment devices 176 are spaced apart and are distributed to provide dimensional and/or positional reference for alignment with counterpart alignment devices on a corresponding alignment guide of an image capturing apparatus for capturing an image of the composite information bearing device for computational processing. Each of the alignment devices is to cooperate with a counterpart alignment device to appear on an image viewer of an image capturing apparatus when an image of the composite information bearing device 170 is to be captured for machine processing. Each alignment device comprises alignment features having complementary properties and the complementary features are to be matched with corresponding complementary features on the image viewer of the image capturing apparatus. The image viewer typically comprises an LCD screen. The machine coded image pattern 172 is represented by 5 binary-bit data points which are depicted in FIG. 3B. The other image components such as the alignment guide and the watermark "CertiEye" appears as noise in the background as they do not have a high frequency component as those of the 5 binary-bit data points. In addition, the machine coded image pattern 172 is distributed within the boundary of the information bearing device 170 and between adjacent alignment devices 176.

Figure 4:
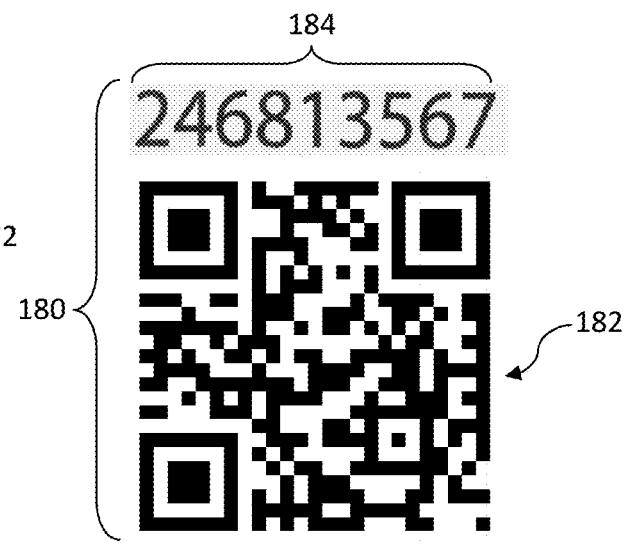
FIG. 4 is a schematic diagram depicting another example composite information bearing device.

A composite information bearing device 180 depicted in FIG. 4 comprises a machine coded image pattern 182 and a human readable device 184. The machine coded image pattern 182 is coded in a format which is known as a "QR" code and contains the binary data string "10101". The human readable device 184 comprises an example alphanumeric data string "246813567". The first data portion of the human readable device 184 "246813" forms a complete target data "10101 246813" when combines with the data value "10101" represented by the coded image pattern 182 and the second data portion of the human readable device 184 "567" forms the verification data "567". The composite information bearing device 180 may represent a string of information such as "www.iil.me/-10101xxxx, where "10101" is the contained binary data.

Figure 5A:
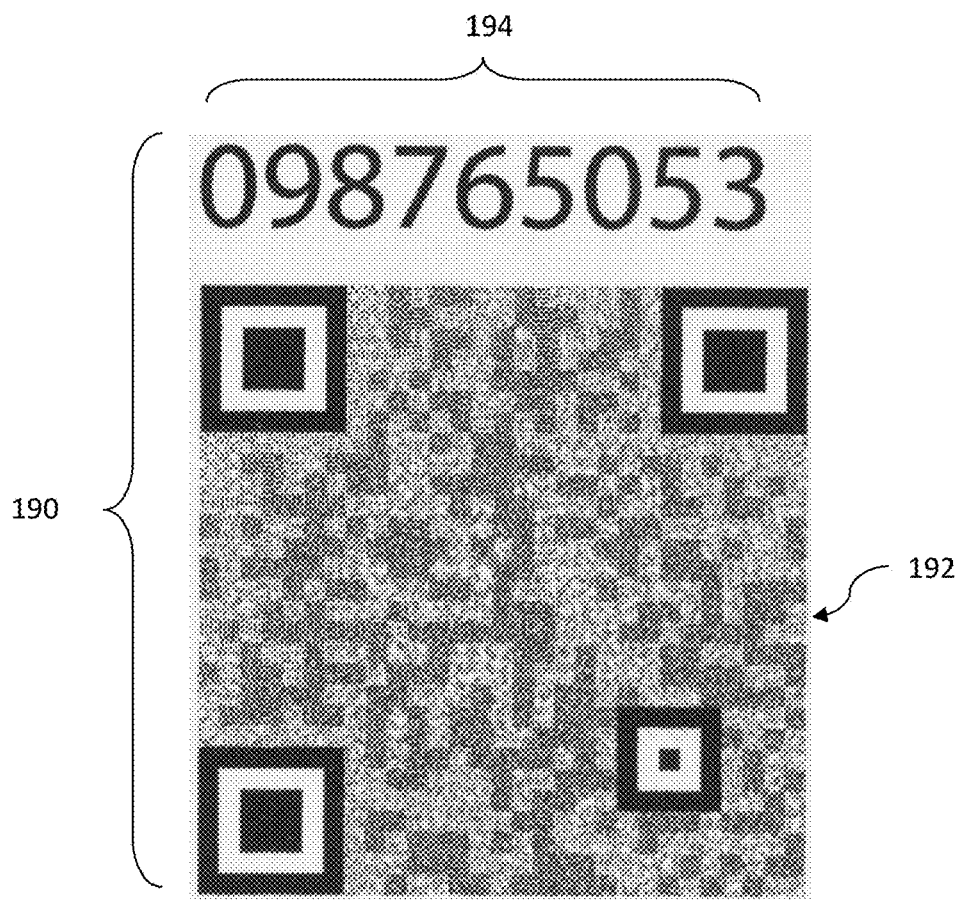
FIG. 5A is a schematic diagram depicting another example composite information bearing device.

A composite information bearing device 190 depicted in FIG. 5A comprises a machine coded image pattern 192 and a human readable device 194. The human readable device 194 comprises an example alphanumeric data string "098765053". The machine coded image pattern 192 is a composite image comprising a QR code and an image formed by transform domain operation in superimposition. The information contained in the QR code may provide an address while the information embedded in the transform domain image may comprise authentication data for verifying authenticity of the device.

Figure 5B:
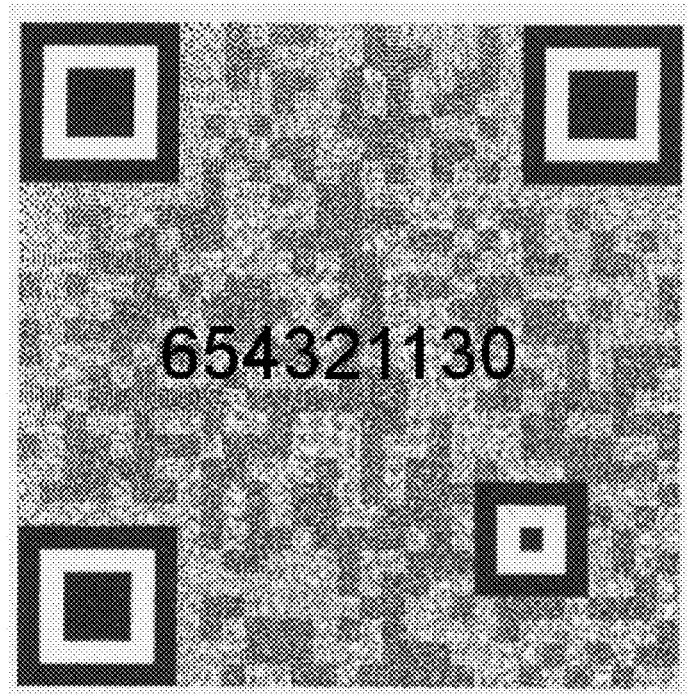
FIG. 5B is a schematic diagram depicting another example composite information bearing device.

In some embodiments, the human readable device may be superimposed onto or merged into the machine coded image pattern as depicted for example in FIG. 5B. Due to the distribution of the finely divided image defining elements around the machine code image, the human readable device remains perceivable to human readers after the superimposition. In some embodiments, for the human readable device, the first data portion may be placed in front of the second data portion, or the second data portion may be placed in front of the first data portion, or the two data portions may be merged together. In some embodiments, the human readable device may be placed anywhere outside and/or inside the machine coded image pattern.

Therefore, composite information bearing devices each comprising a machine coded image pattern have been described.

In some embodiments, the machine coded image pattern is to represent a portion of a target data, and another portion of the target data is represented by one of said first data portion or said second data portion of the human readable data device.

The portion of target data represented by the machine coded image pattern may form the more significant portion of the target data. The portion of the target data represented by the human readable data device may comprise the less significant portion of the target data. The data portion of the human readable data device not representing the target data may represent the verification code. The verification code is related to the target data by a predetermined scheme of operation such that the verification code can be used to verify the target data. The target data may be used as an identification code to provide a unique identity or identification code for each composite information bearing device.

In some embodiments, for example, those depicted in FIGS. 1A and 1B, the machine coded image pattern is to represent authentication data to facilitate verification of target data represented by the human readable device.

In some embodiments, for example, those depicted in FIGS. 1C to 1F, the machine coded image pattern is to represent a portion of target data and this portion of the target data is to combine with another portion of the target data represented by a portion of the human readable device to form a complete target data. The other portion of the human readable device not representing a portion of the target device may comprise data representing verification data for verifying the target data.

In some embodiments, the machine coded image pattern may represent the target data and the human readable device may represent verification or authentication data.

In some embodiments, the machine coded image pattern may represent verification or authentication data and the human readable device may represent the target data.

A target data may be an identification or serial number, such as identification number on travel documents, or serial number of goods, articles, products, or services.

Composite information bearing devices may be applied on goods, articles, products, or live objects such as animals or human beings for tracking.

Where the machine coded image pattern is to represent a portion of the target data, a single machine coded image pattern can be used to compose many different composite information bearing devices representing many different serial or identification codes or numbers.

Figure 6A:
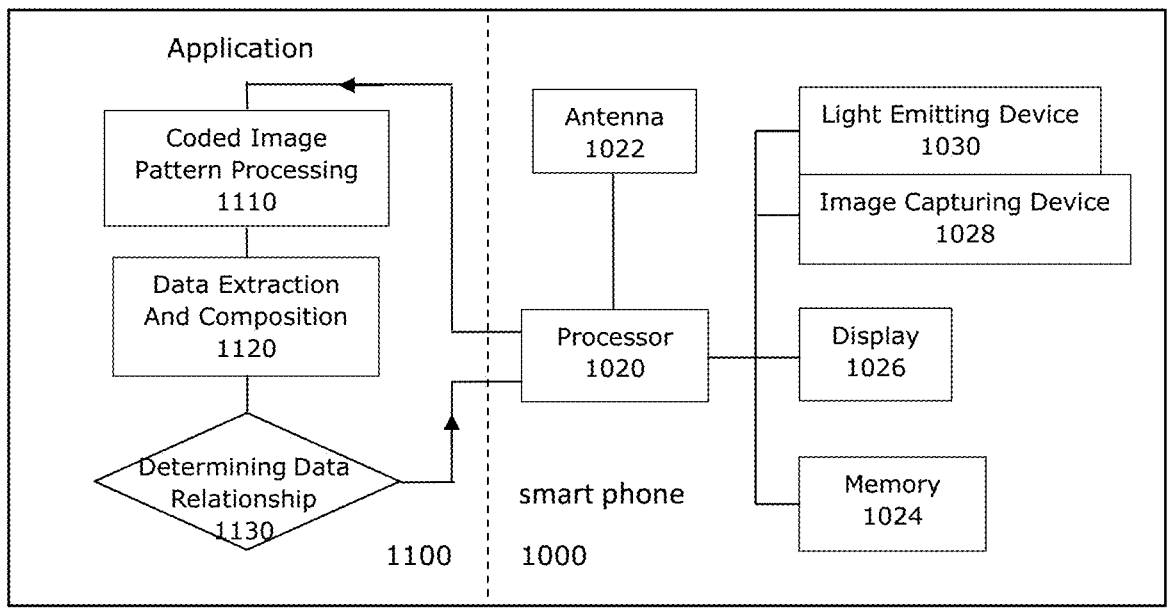
FIG. 6A is a schematic block diagram of an example apparatus for processing a composite information bearing device.

FIG. 6A depicts a functional block diagram of an apparatus 1000 for capturing and processing a composite information bearing device. The apparatus 1000 comprises a processor 1020, an antenna 1022, a memory 1024, a display 1026, an image capturing device 1028 and a light emitting device 1030. The apparatus 1000 has a hardware arrangement that is the same as a smart mobile phone. The antenna 1022 is to provide a communication interface to facilitate data communication between the apparatus 1000 and an external telecommunication network. The processor 1020 is operable to load and execute an application program. Upon execution of the application program, the processor will generate alignment devices on the display and guide a user to align the apparatus with a target composite information bearing device. When the target composite information bearing device shown on the display screen is aligned with the alignment devices, the processor will operate the image capturing device 1028 to capture an image of the target composite information bearing device. After an image of the target composite information bearing device has been captured, the image will be stored in the memory, and the processor will identify the target data and the verification data. Next the processor will operate to determine the relationship between the target data and the verification data, and to provide an outcome of relationship determination. Where the verification is for verifying the target data, the processor will generate an outcome to inform a user whether the verification is successful.

In an example execution of an application program as depicted in 1100 of FIG. 6A, the processor is to process the machine coded image pattern at 1110 to retrieve a set of data. The process may be by reverse Fourier Transform where the data was coded by Fourier Transform, or by reverse Bessel Transform when the data was coded by Bessel Transform. The processor will extract data symbols represented by the human readable data device by optical character recognition at 1120 and construct an identification code and a verification code. The processor will then determine relationship between the identification code and the verification code thus constructed and generate an outcome of relationship determination on the display 1026 at 1130. The outcome will be positive if the relationship between the identification code and the verification code is according to a predetermined relationship. The outcome will be negative if the relationship between the identification code and the verification code is not according to the predetermined relationship.

Figure 6B:
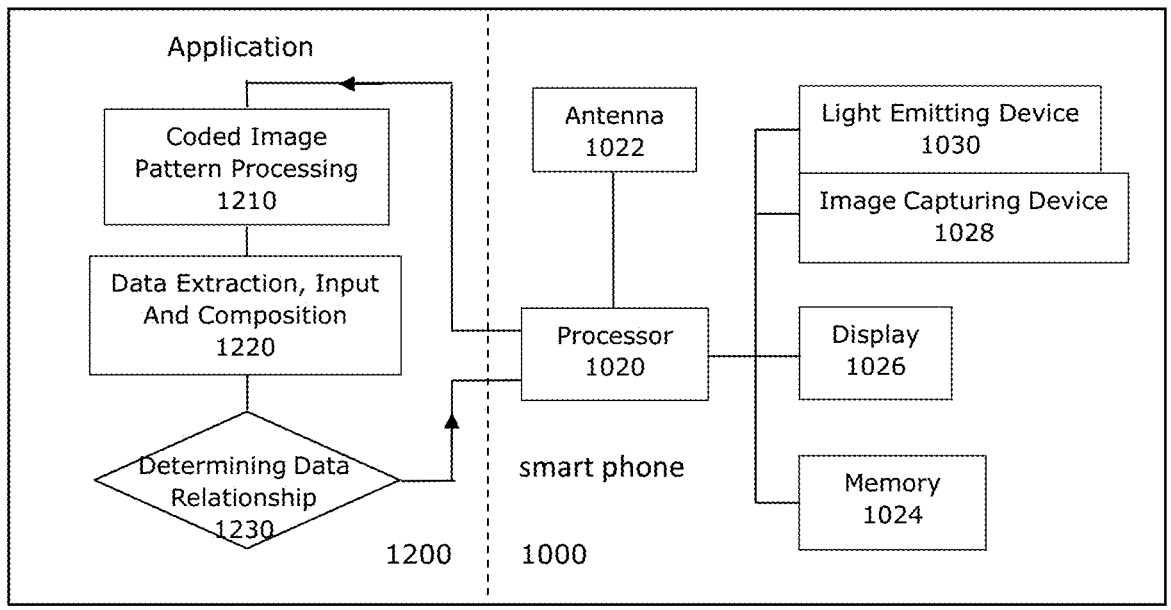
FIG. 6B is a schematic block diagram of another example apparatus for processing a composite information bearing device.

In an example execution of an application program as depicted in 1200 of FIG. 6B, the processor is to process the machine coded image pattern at 1210 to retrieve a set of data. The process may be by reverse Fourier Transform where the data was coded by Fourier Transform or by reverse Bessel Transform when the data was coded by Bessel Transform. The processor will obtain data symbols or some of the data symbols represented by the human readable data device by user input at a user input interface at 1220. The processor may extract some of the data symbols represented by the human readable data device by optical character recognition ('OCR') to recompose the identification code and the verification code at 1220. In some embodiments, the first data portion forming part of the target data may be extracted by OCR while the second data portion forming the verification code may be obtained by user input. In some embodiments, the first data portion forming part of the target data may be extracted by user input while the second data portion forming the verification code may be obtained by OCR. The processor will then determine relationship between the identification code and the verification code thus constructed and generate an outcome of relationship determination on the display 1026 at 1230.

In some embodiments, the first data portion forming part of the target data may be extracted by user input and the second data portion forming the verification code may also be obtained by user input. In some embodiments, the first data portion forming part of the target data may be extracted by OCR or other automated means while the second data portion forming the verification code may also be obtained by OCR.

Figure 7A:
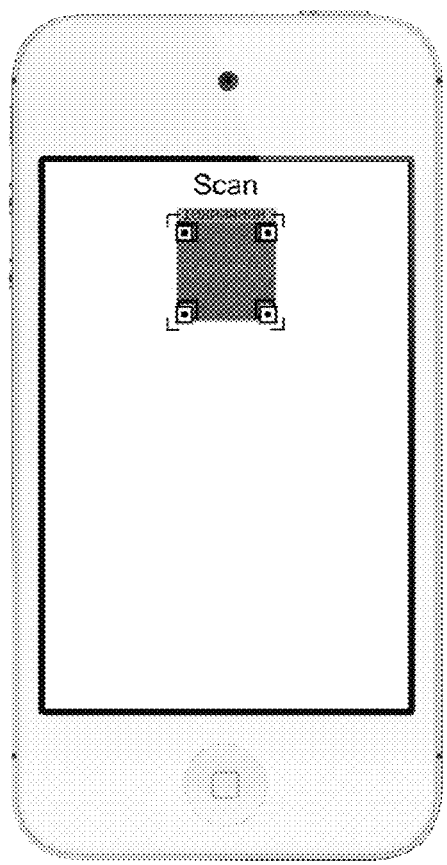
FIGS. 7A to 7C are views depicting an example operation of an example apparatus on an example composite information bearing device.
Figure 7C:
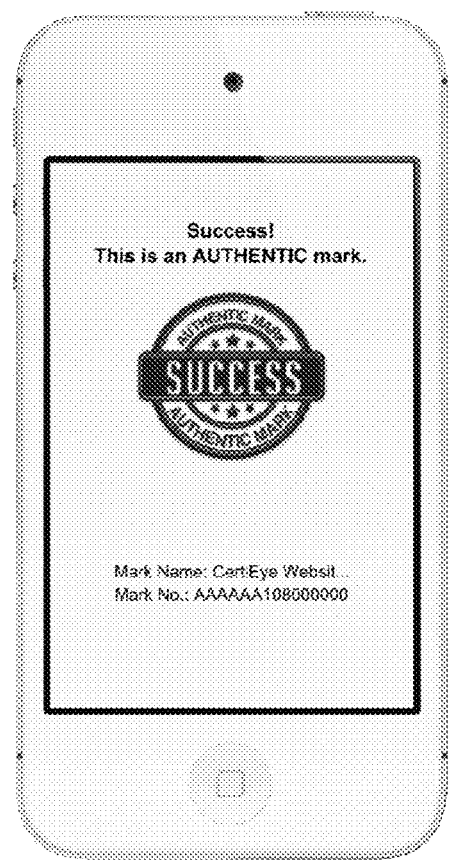
Figure 7B:
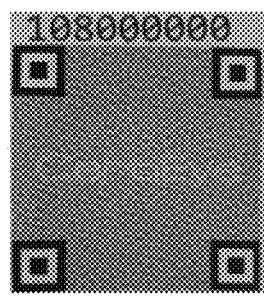

FIGS. 7A to 7C depict example operations using the apparatus 1000 to process a composite information bearing device of FIG. 7B. Initially, an application program 1100 is stored on the apparatus 1000. When the processor 1020 executes the application program 1100, an application screen will be displayed on the display 1026 and this application screen includes an alignment guide comprising a plurality of alignment devices on an alignment window. The alignment devices generated by the application program is for complementary alignment with the alignment devices on the composite information bearing device and includes four alignment devices which are distributed at four corners of the alignment window. After the alignment devices on the apparatus are aligned with the counterpart alignment devices on the composite information bearing device, the processor is to operate the image capturing device to capture an aligned image of the composite information bearing device. When desirable, the processor may optionally operate the light emitting device 1030 to provide illumination to the composite information bearing device. After the image of the composite information bearing device has been captured, the processor will recompose the target code and the verification code at 1120, and to generate a screen display signifying successful verification at 1130 as shown in FIG. 7C.

Figure 8D:
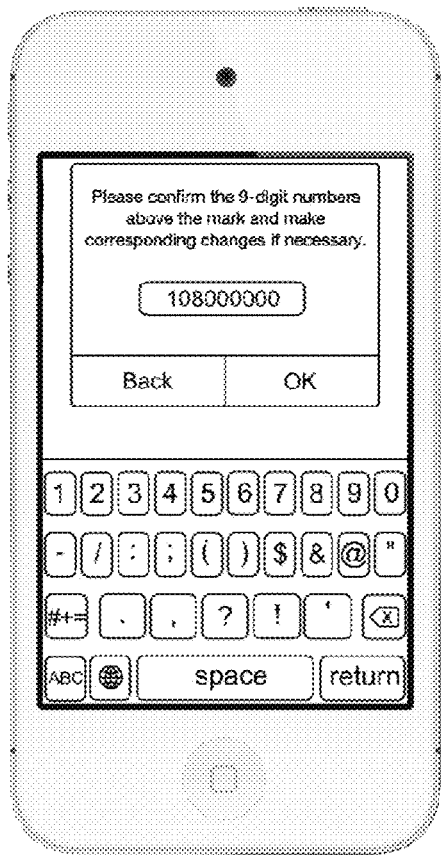
FIGS. 8A to 8E are views depicting another example operation of an example apparatus on an example composite information bearing device.
Figure 8E:
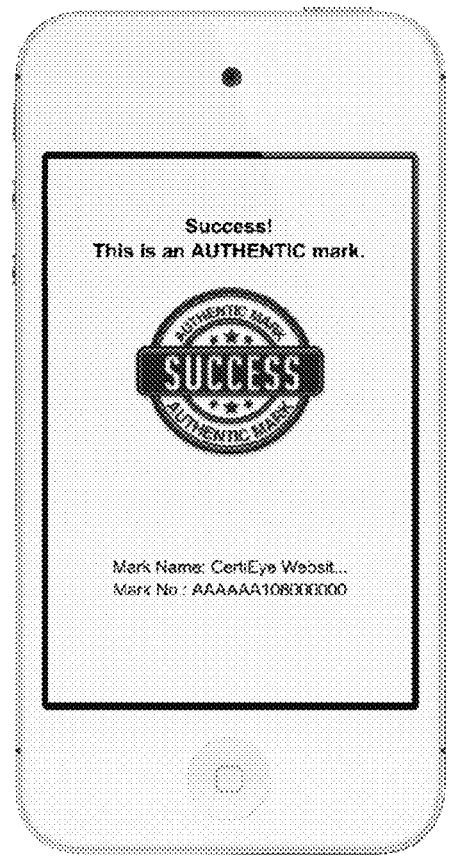
Figure 8A:
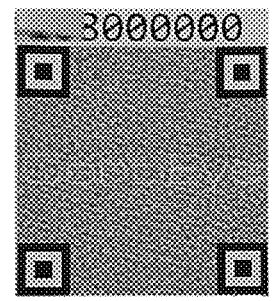
Figure 8B:
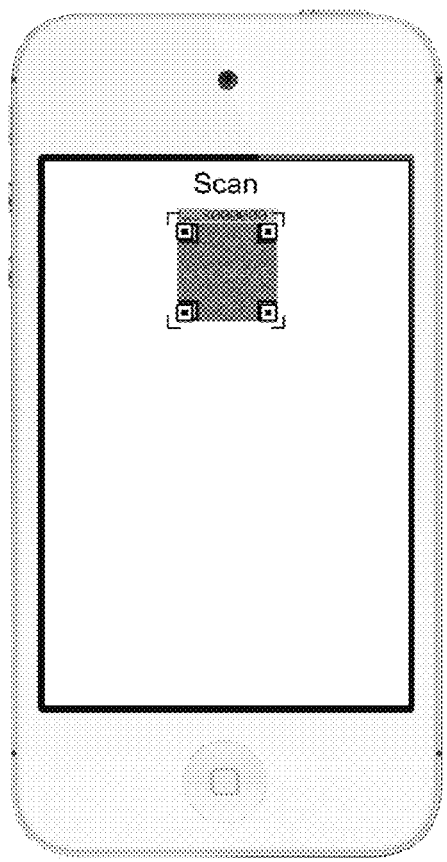
Figure 8C:
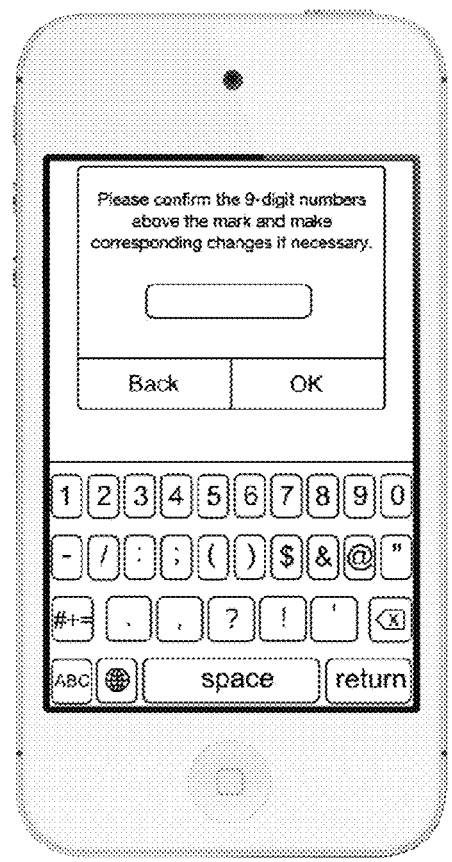

In an execution example of the application program 1200, a composite information bearing device of FIG. 8A is to be captured and processed. The leading portion "108" of the human readable data device of this composite information bearing device is not detected during the process (as the portion is temporarily covered). Upon execution of the application program 1200 after capturing and analyzing an image of the composite information bearing device as shown in FIG. 8B, the processor determines that the outcome of relationship determination is negative at 1230; hence, the processor will then generate a window to invite a user to input the data symbols "108000000" represented by the human readable data device as shown in FIGS. 8C and 8D. If the correct string of data symbols is inputted, the processor will generate a screen display signifying successful verification at 1230 and shown in FIG. 8E.

Figure 9A:
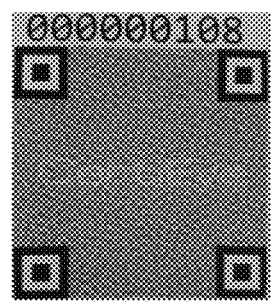
FIGS. 9A to 9E are views depicting yet another example operation of an example apparatus on an example composite information bearing device.
Figure 9B:
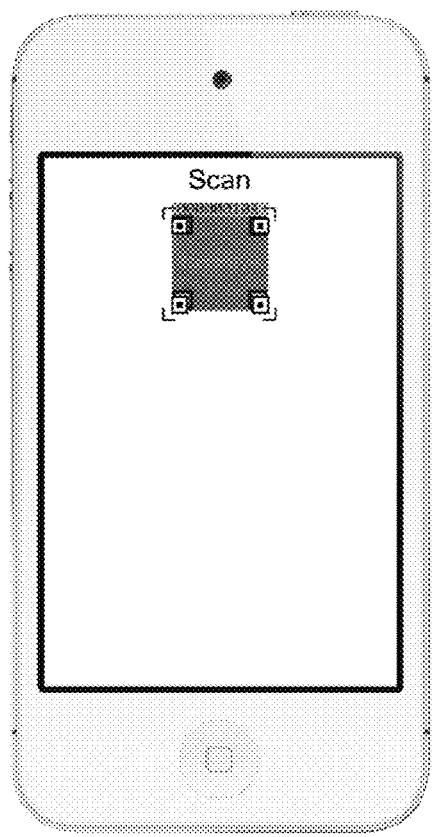
Figure 9C:
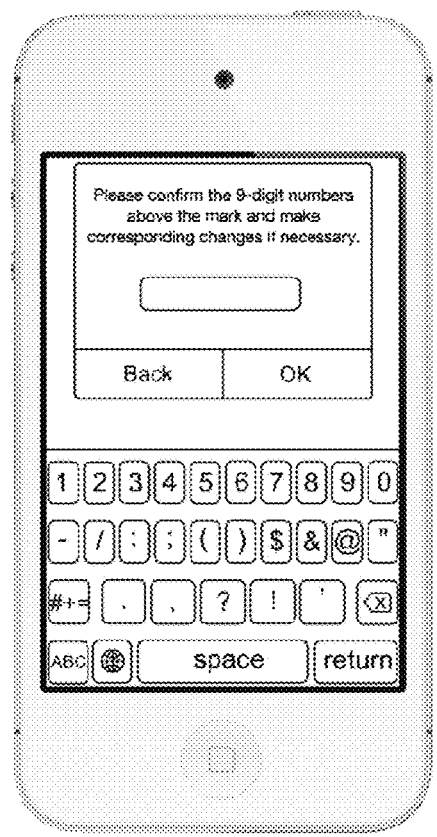
Figure 9D:
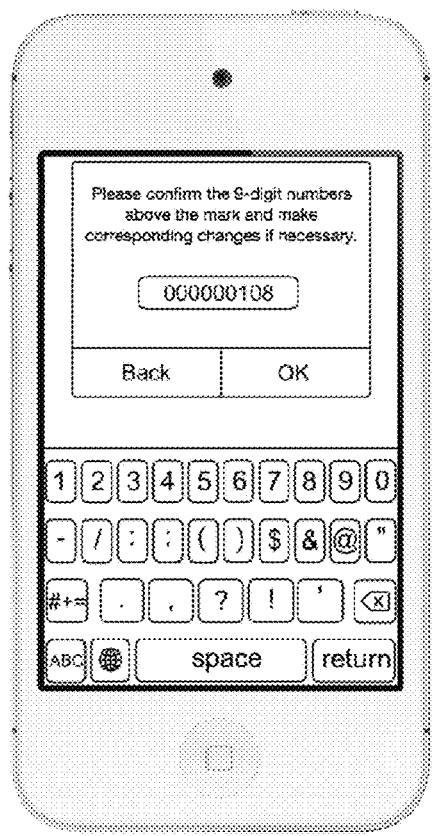
Figure 9E:
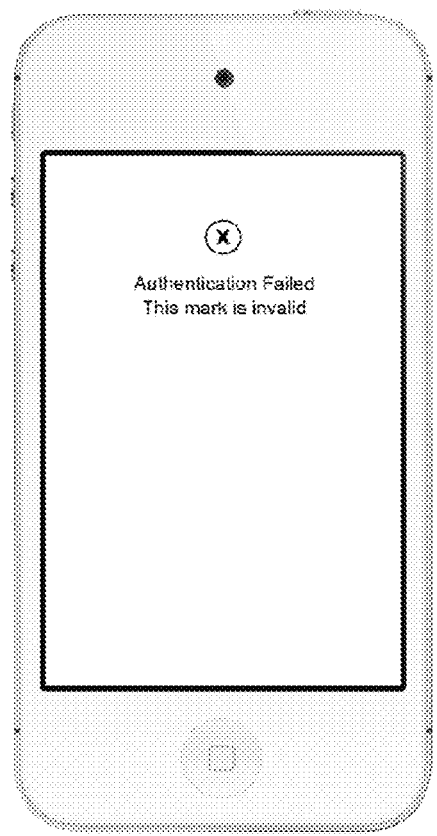
Figures 10A, 10B:
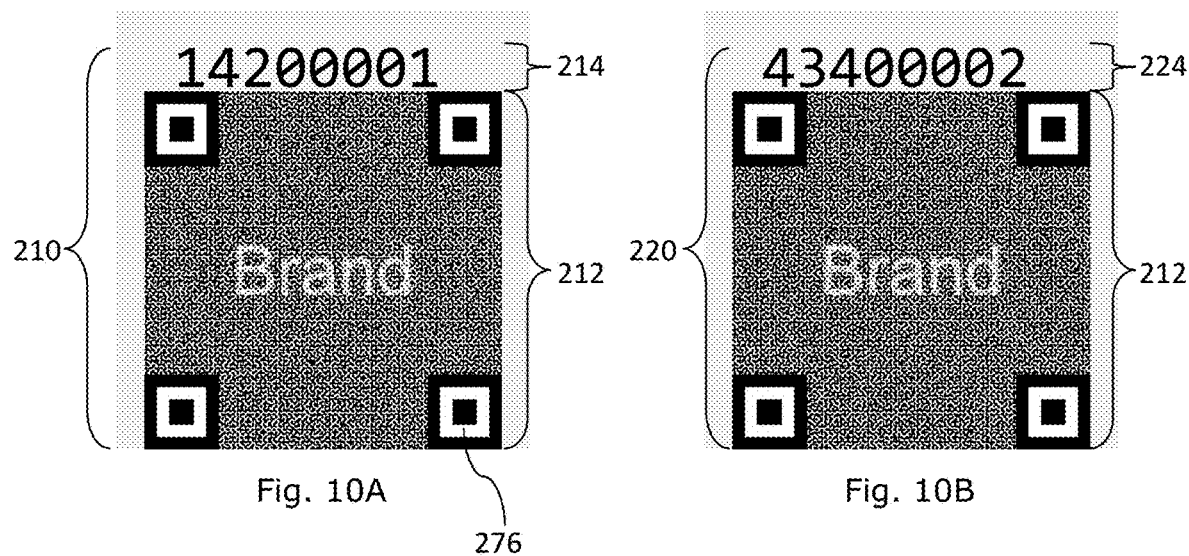
FIGS. 10A to 10E are images depicting example labels comprising example composite information bearing device and forming an aggregate according to the disclosure.
Figures 10C, 10D:
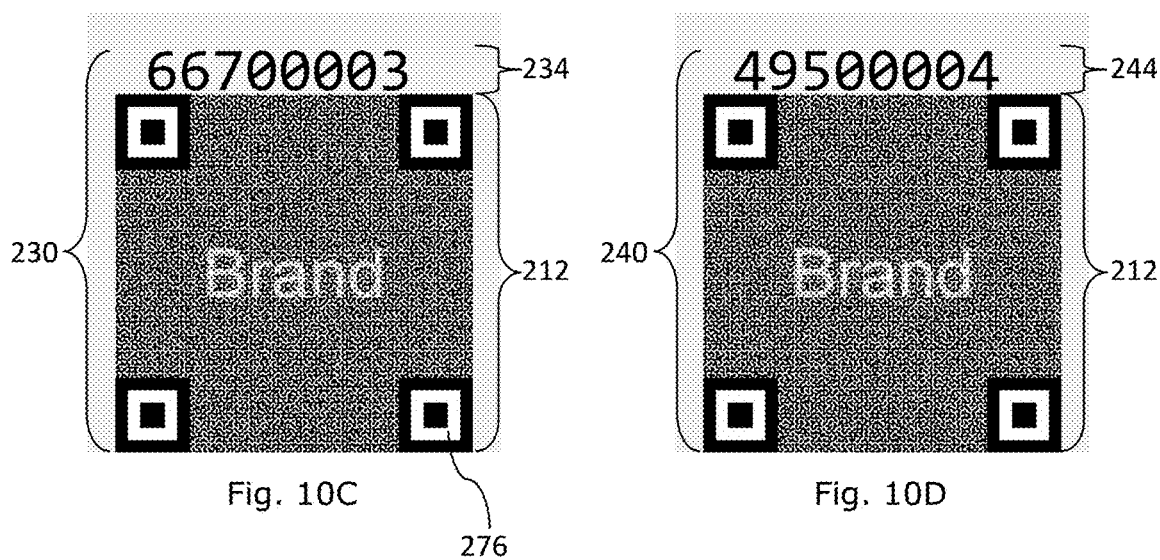
Figure 10E:
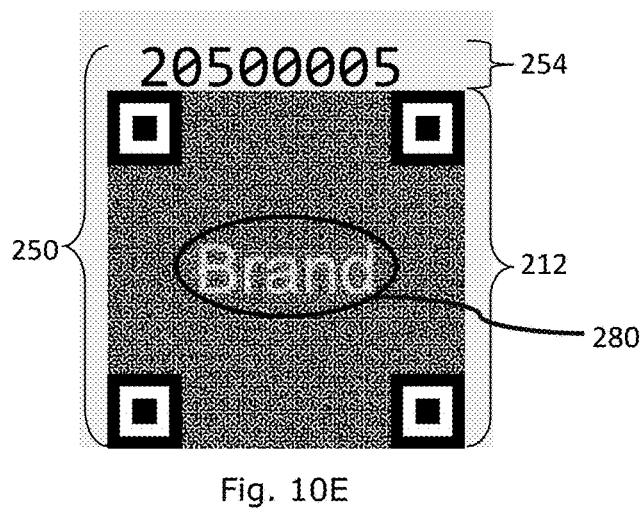

In an execution example of the application program 1200, a composite information bearing device of FIG. 9A is to be captured and processed. The human readable data device of this composite information bearing device comprises an incorrect string of data symbols "000000108" instead of the correct string of data symbols "108000000". Upon execution of the application program 1200 as depicted in FIG. 9B, an image of the composite information bearing device will be captured and the data represented by the machine coded image pattern will be recovered. The processor will generate a window to invite a user to input the data symbols through a user input interface as depicted in FIGS. 9C and 9D. A negative outcome message is generated at 1230 and displayed as shown in FIG. 9E signifying that the verification code is incorrect.

FIGS. 10A to 10E depicts example labels which are for attaching to clothing or apparel items. The labels may be imprinted on a carrying medium such as fabric materials, paper, or plastics. Each example label comprises a composite information bearing device 210, 220, 230, 240, 250 including a human readable data device 214, 224, 234, 244, 254, a machine coded image pattern 212 and an alignment guide. Each human readable data device 214, 224, 234, 244, 254 comprises a string of alphanumerical data defining a first set of data, the first set of data comprising a first data portion and a second data portion. Each machine coded image pattern 212 comprises a plurality of image defining elements which are distributed within a boundary to collectively represent a second set of data comprising a third data portion. The alignment guide comprises a plurality of alignment devices 276. Descriptions herein in relation to the human readable data device, the machine coded image pattern, and the alignment guide are applicable and are incorporated herein by reference.

In addition, another, or a second, human readable device "Brand" 280 is embedded in the pool of image defining elements that collectively define the machine coded image pattern. This human readable device is perceivable, and/or extractable by optical character recognition, even embedded in the machine coded image pattern and can form part of the first set of data. Alternatively, this human readable device can be provided solely as user perceivable information only.

The composite information bearing devices 210, 220, 230, 240, 250 of the example labels collectively form an aggregate of identification devices having a common or same machine coded image pattern 212 while each of the human readable data devices is unique or distinctive. Each unique or distinctive human readable data device includes an identification portion and a verification portion.

In the example labels of FIGS. 10A to 10E, the machine coded image pattern 212 represents a first portion of an identification code, the first 3 data symbols on the first human readable data device which is above the machine coded image pattern 212 represents a verification code, and the last 5 data symbols of the first human readable data device represents a second portion of the identification code.

The example labels of FIGS. 10A to 10E are an aggregate of labels each of which having a unique or distinctive identification code, and the identification codes are in a serial or sequential order as below:

| device | Identification code | Verification code |
|--------|---------------------|-------------------|
| 210    | 3FFFFFFF00001       | 142               |
| 220    | 3FFFFFFF00002       | 434               |
| 230    | 3FFFFFFF00003       | 667               |
| 240    | 3FFFFFFF00004       | 495               |
| 250    | 3FFFFFFF00005       | 205               |

The first portion of the identification codes ("3FFFFFFF") as represented by the machine coded image pattern 212 constitutes the most or more significant portion of the identification codes. The last 5 data symbols of the identification codes as represented by the second portion of the identification code constitutes the least or less significant portion of the identification codes.

When the second human readable data device 280 forms part of the first set of data, the alphanumeric string of this second human readable device 280 or its representative value will form part of the identification code.

Figure 11:
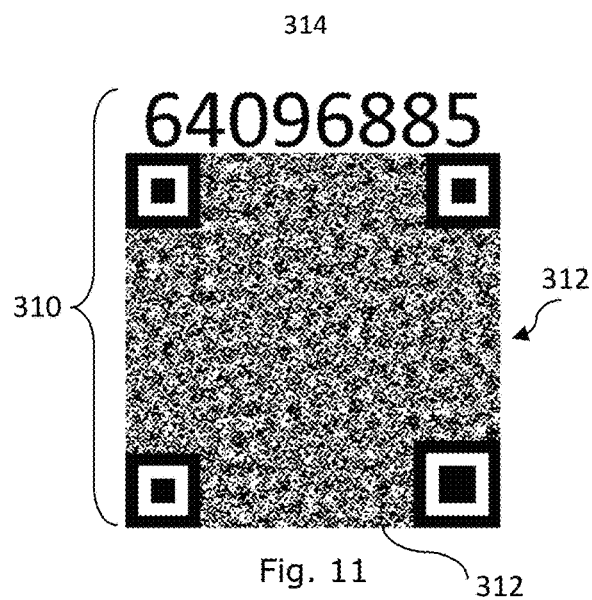
FIG. 11 shows an information bearing device according to the disclosure.

An example information bearing device 310 as shown in FIG. 11 comprises an image pattern 312 and a human readable data device 314. The example image pattern is data encoded by a steganographic scheme to represent a data portion, the data portion comprising a plurality of data components. The example data portion has an example numerical value, which in the decimal system has a value of 123,456,789. The example data components are arranged in an array to form a string of data components. In this example, the string of data components is in the form of a binary data sequence comprising an example plurality of 32 binary data bits and expressed in the binary representation of 0000 0111 0101 1011 1100 1101 0001 0101. Each of the binary bit of the binary sequence in this example is an example data component embedded in the data embedded image pattern 312.

The example human readable data device 314 comprises a set of numerals expressed in an example numeral string of 64096885. The example set of numerals comprises one data portion which comprises the numeral sequence 64096 and another numeral sequence which is 885. An example relationship between the data encoded in the image pattern 312 and the numerals contains in the numeral string is expressed in the form of: check_digit=remainder of (first_data_portion+ID) %1000, where the % operator means the division operator, the example check-digit is a portion of the numeral string which in this example is the last three digits of the numeral string (which is 885 in this example), the parameter 'ID' means an identification code or identification data which is embedded in the image pattern, and the first_data portion means the first five digits of the numeral string (which is 64096 in this example), and remainder means the remainder value after the division operation. In this example, the check digit and the remainder of (first_data-_portion+ID) %1000 when processed by an authentication apparatus are both found equal to 885 and the authentication apparatus will output an outcome that the information bearing device is genuine. In this example, both the check digit and the remainder of (first_data_portion+ID) %1000 are security features for machine determination of authenticity or genuineness of the information bearing device. In some examples, some of the security features embedded in the image pattern may be lost after unauthorized copying and authentication by the authentication apparatus will fail to produce a positive or affirmative outcome to put the authenticity of the information bearing device or an article attached with the information bearing device.

The example an image pattern 312 is embedded with an example plurality of 32 data components each of which is a data bit in this example. The example data components are distributed on a data plane and the example data plane has a set of orthogonal reference coordinate axis u and v in spatial frequency units of lines-per-inch or cm-per-inch as an example. The example data components are scattered data points in the data plane of FIG. 11A. The example data components are arranged as a data array comprising an example plurality of the 32-data components arranged in a sequence according to a predetermined rule. According to the predetermined rule, the example plurality of data components is arranged as a sequence of bits in the form of $B_{31}$, $B_{30}$, ..., $B_i$, ..., $B_1$, ..., $B_0$, where $B_i$ means the i-th data bit. The data components are arranged according to a predetermined order, for example, with the leftmost data bit, i.e., $B_{31}$ as the most significant bit (MSB) and the rightmost bit, that is $B_0$, as the least significant bit (LSB). The position of a data component in the ordered sequence has a weight or significance attached to it. For example, a data component at a position index i in the sequence carries a weight or significance which is dependent on the position index. For example, a data component in the example sequence having a position index of i, which means the data position is in the i-th position from position 0, which is the position of the least significant bit has an example weight of $2^i$. It will be appreciated that the weight or significance of a data component is not identifiable from the data plane and is determined according to a predetermined rule stored in an authentication scheme which comprises a reversal scheme to the steganographic encoding scheme in this example.

The example plurality of binary data bits is embedded by an example scheme of digital stenography to form the image pattern 312. An example scheme of digital stenography is by way of Fourier Transform operation which is expressible in the form of:

$$f(x, y) = \sum_{u=0}^{N-1} \sum_{v=0}^{M-1} D(u, v) \exp\left(\frac{j2\pi ux}{N}\right) \exp\left(\frac{j2\pi vy}{M}\right).$$

A data D(u,v) in the data plane corresponding to the about transformation is as follows:

$$D(u, v) = \frac{1}{MN} \sum_{u=0}^{N-1} \sum_{v=0}^{M-1} f(x, y) \exp\left(-\frac{j2\pi ux}{N}\right) \exp\left(-\frac{j2\pi vy}{M}\right)$$

The spatial frequency $\omega(u,v)$ of a data point at coordinates u, v is determined by the relationship below:

$$\omega(u, v) = \sqrt{\left(u - N*H\left(u - \frac{N}{2}\right)\right)^2 + \left(v - M*H\left(v - \frac{M}{2}\right)\right)^2},$$

where M is the number of pixels in a column of an image pattern pixel matrix, N is the number of pixels in a row of an image pattern pixel matrix, and f(x,y) is the signal magnitude or brightness level at a spatial coordinate (x,y) due to the data value D(u,v) of a data point D in the u, v domain, where can be any one of the discrete data bits $B_i$, and H is the Heaviside step function. For the avoidance of doubt, f(x,y) define the spatial properties of the pixels of an image pattern before conversion to the bi-level data value and before the alignment device is added.

$$H(x) = \begin{cases} 0, & x < 0 \\ 1, & x \geq 0 \end{cases}$$

The Heaviside function H(x) has the characteristics:

In the example, the example plurality of 32 data bit are discrete data bits having example u,v coordinate values and data values as set out in Table 5 below and D(u,v) can be the value of any one of the discrete data bits or the plurality of the discrete data bits forming an ensemble of discrete data bits $B_i$.

TABLE 5

| Bit# (i) | u | v | Bit value | $D_i$ (u, v) |
|---|---|---|---|---|
| 31 (MSB) | 13 | 2 | 0 | 0 |
| 30 | 12 | 4 | 0 | 0 |
| 29 | 11 | 7 | 0 | 0 |
| 28 | 10 | 9 | 0 | 0 |
| 27 | 8 | 10 | 0 | 0 |
| 26 | 6 | 12 | 1 | 255 |
| 25 | 3 | 13 | 1 | 255 |
| 24 | 1 | 13 | 1 | 255 |
| 23 | −1 | 13 | 0 | 0 |
| 22 | −3 | 13 | 1 | 255 |
| 21 | −6 | 12 | 0 | 0 |
| 20 | −8 | 10 | 1 | 255 |
| 19 | −10 | 9 | 1 | 255 |
| 18 | −11 | 7 | 0 | 0 |
| 17 | −12 | 4 | 1 | 255 |
| 16 | −13 | 2 | 1 | 255 |
| 15 | 19 | 3 | 1 | 255 |
| 14 | 18 | 7 | 1 | 255 |
| 13 | 16 | 10 | 0 | 0 |
| 12 | 14 | 13 | 0 | 0 |
| 11 | 11 | 15 | 1 | 255 |

TABLE 5-continued

| Bit# (i) | u | v | Bit value | $D_i$ (u, v) |
|---|---|---|---|---|
| 10 | 8 | 17 | 1 | 255 |
| 9 | 5 | 18 | 0 | 0 |
| 8 | 1 | 19 | 1 | 255 |
| 7 | −1 | 19 | 0 | 0 |
| 6 | −5 | 18 | 0 | 0 |
| 5 | −8 | 17 | 0 | 0 |
| 4 | −11 | 15 | 1 | 255 |
| 3 | −14 | 13 | 0 | 0 |
| 2 | −16 | 10 | 1 | 255 |
| 1 | −18 | 7 | 0 | 0 |
| 0 (LSB) | −19 | 3 | 1 | 255 |

Each of the example discrete data $B_i$ has an example data value $D_i(u,v)$ of between 0 and 255 corresponding to the number of brightness or grey levels of a digital system having an example plurality of 256 quantization levels. In this example, the data value of $D_i(u,v)$ is either 0 or 255, corresponding to binary data values of 0 and 1 respectively.

In the present example, each example discrete data of Table 5 has a spatial frequency of either 13 lines-per-cm (33 lines-per-inch/LPI) or 19 lines-per-cm (48LPI). The data points are embedded at these example frequencies for convenient decoding of the ID. In example embodiments, a discrete data bit may have a spatial frequency higher than 50LPI without loss of generality.

For example, the spatial frequency of the data point due to bit number 31, $B_{31}$, is determined by inserting the corresponding values into the above equation, with M=N=472 in an example square of 1 cm, as a convenient example:

$$\omega(13,2) = \sqrt{(13-472*H(13-236))^2 + (2-472*H(2-236))^2} = 13$$

To have the data points represented in a coordinate system where the coordinate axes have an origin at center of the square reference frame, an axes-shifting transformation is performed such that:

$$D(u, v) = \hat{D}\left(N*H\left(u - \frac{N}{2}\right) - u, M*H\left(v - \frac{M}{2}\right) - v\right).$$

Figure 11A:
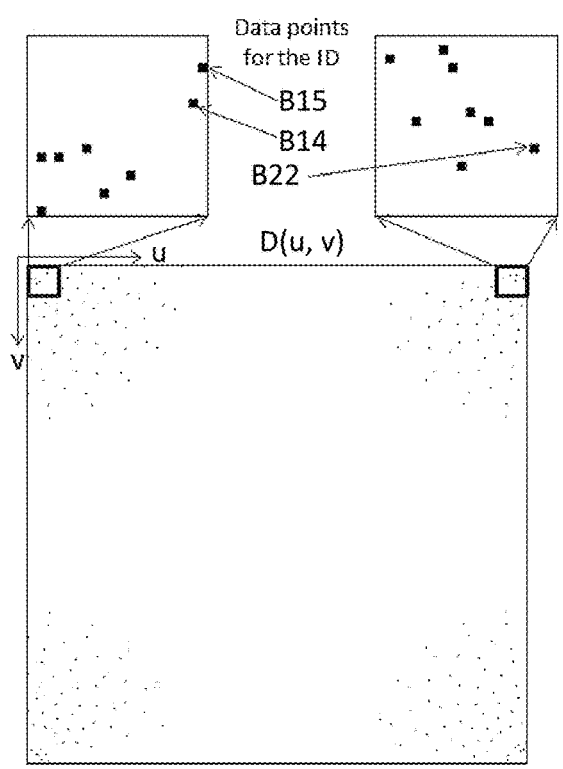
FIG. 11A is a schematic diagram showing example data values of $D(u,v)$ in the u–v domain due to example digital steganographic processing of a plurality of discrete data bits $B_i$, where i=0 to 31.
Figure 11B:
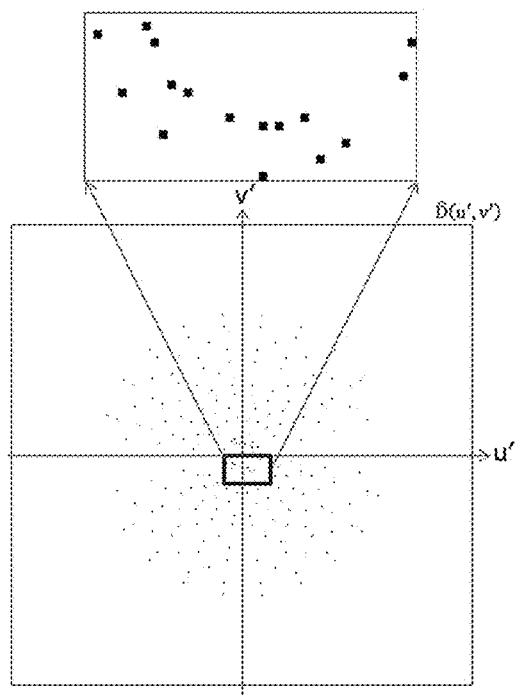
FIG. 11B is a schematic diagram showing example data values of $D(u,v)$ in a shifted-axes u'–v' domain as $D'(u', v')$.

With the axes-shifting transformation or swapping of coordinates, the discrete data points are represented using the u',v' coordinate system as depicted in FIG. 11B, wherein u', v' and u, v are correlated respectively by the relationship above.

When in the u', v' coordinate system, the image pattern and the data are correlated by the following relationship:

$$f(x, y) = \sum_{u=-\frac{N}{2}}^{\frac{N}{2}-1} \sum_{v=-\frac{M}{2}}^{\frac{M}{2}-1} \hat{D}(u, v) \exp\left(-\frac{j2\pi ux}{N}\right) \exp\left(-\frac{j2\pi vy}{M}\right)$$

For example, with M=N=472, discrete data points in the u, v and u', v' coordinate systems are correlated by:

$$D(u,v) = \hat{D}(472*H(u-236)-u, 472*H(v-236)-v)$$

In the frequency domain data representation of FIG. 11A or 11B, the frequency domain data may be due to the discrete data $B_i$, as well as other data points which are not due to $B_i$, as represented below:

$$D(u,v)=[\Sigma_{i=0}^{31}D_i(u,v)]+D'(u,v),$$

where $[\Sigma_{i=0}^{31} D_i(u,v)]$ is due to the binary data bits $B_i$, and D' (u,v) is not due to the binary data bits $B_i$.

In the above examples, the spatial properties of the data-bearing image patterns are an aggregate of spatial properties due to the individual data components. For example, the spatial properties of the image patterns formed by steganographic encoding of the data components $P_1$, $P_2$, $P_3$, $P_4$, $P_5$, and $B_{31}$, $B_{30}$, ..., $B_i$, ..., $B_1$, ..., $B_0$ are due to superimposing the spatial properties of the individual data component when individually processed by the steganographic scheme. In this example, the superimposition of spatial properties is by linear superimposition of the spatial image patterns formed by individual transformation of the individual data component by the steganographic process, but other rules of superimposition can be applied without loss of generality.

When a data component is transformed from the data domain (u, v axes) to the spatial domain (x,y axes), the transformation will result in spreading of the spatial properties of a data component across the entire area of the data bearing region of the data-bearing image, and the spatial properties of the individual data component are not confined in a confined or localized area such as that the area of a data bit of a conventional QR code.

Furthermore, the spatial domain properties of each one of the data components $B_i$, $P_i$ are spread throughout the entire area of the data bearing region of the data-bearing image and the spatial domain properties of the entirety of the data components $B_i$, P, are overlapping in the entire data bearing region of the data-bearing image.

Furthermore, the spatial properties of the image patterns are dependent on the aggregate of data components and not dependent on the order of the data components in the data sequence or array. In other words, the spatial distribution properties of the data-bearing image pattern are independent of the order of the data components in the array or sequence, which are only know by the authentication or verification scheme, thereby providing enhanced security features to combat counterfeiting.

For example, the spatial distribution properties f(x,y) of the data-bearing images are the same for the data sequence: $P_1$, $P_2$, $P_3$, $P_4$, $P_5$; sequence $P_1$, $P_2$, $P_1$, $P_2$, $P_3$; sequence $P_2$, $P_1$, $P_4$, $P_3$, $P_5$; etc., and the spatial distribution properties f(x,y) are the same for the data sequence $B_{31}$, $B_{30}$, ..., $B_i$ ..., $B_1$, ..., $B_0$; the data sequence r $B_1$, $B_{30}$, ..., $B_i$ ..., $B_1$, ..., $B_{31}$; the data sequence $B_{31}$, $B_1$, ..., $B_i$ ..., $B_1$, ..., $B_{30}$; etc., without loss of generality. Therefore, the order or position of a data component in the data sequence or area has no bearing on the spatial distribution properties f(x,y) of the data-bearing images and the spatial distribution properties f(x,y) of the data-bearing images represent a non-vectored spatial distribution.

Figure 12:
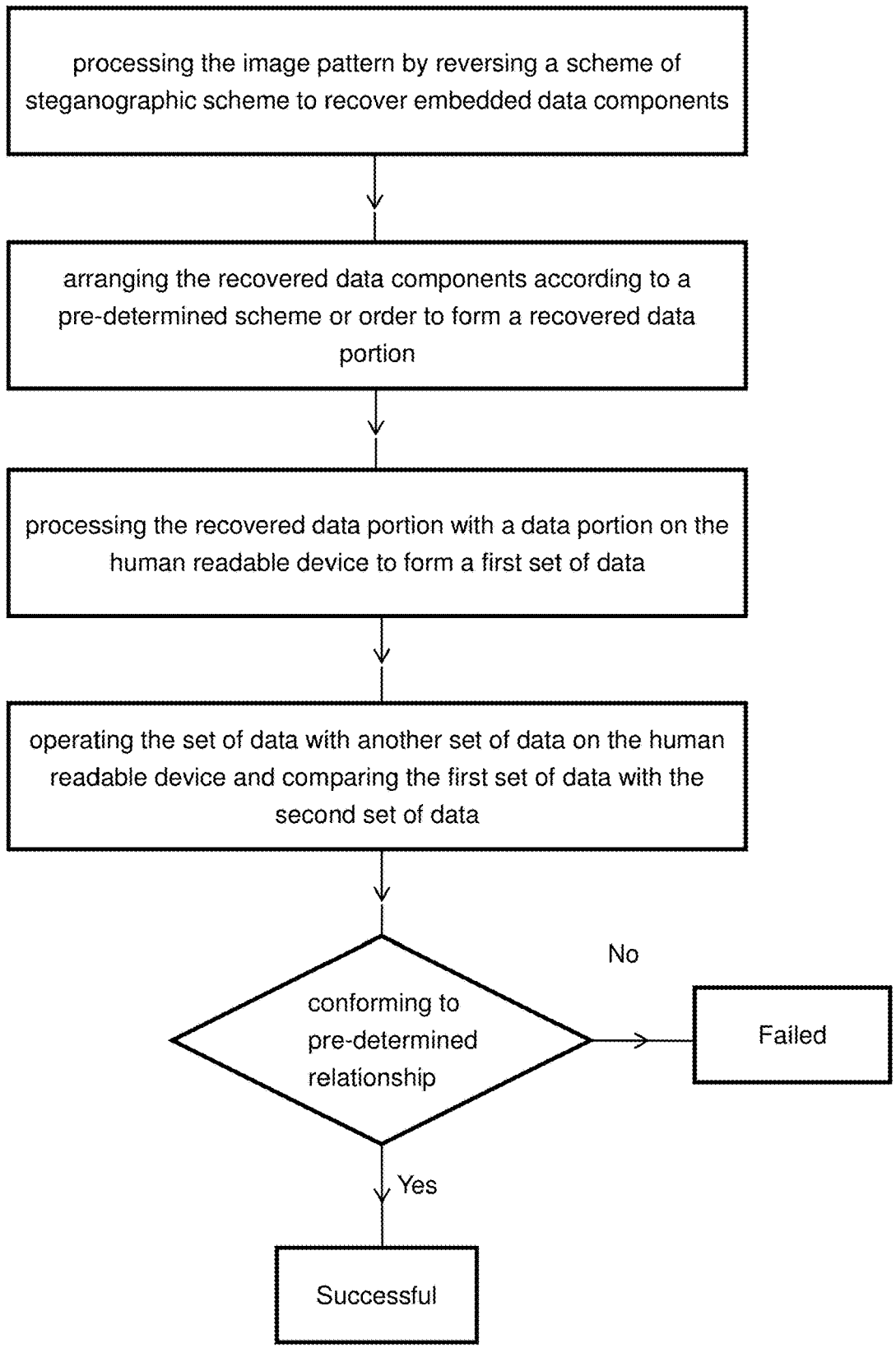
FIG. 12 is a flow diagram showing processing of an image bearing device to recover embedded data to compare relation of data constructed by the recovered data to verify compliance of relationship.

To verify authenticity of an information bearing device, an authentication apparatus on executing stored instructions is to capture an image of the information bearing device with a sufficient resolution, to recovered the data components embedded in the data-bearing image of the information bearing device, to construct a set of data using the recovered data portion, to process the set of data with the data portions in the human readable device, and to compare the data or sets of data to verify whether a predetermined relation between the data or sets of data exists to provide outcome of verification or authentication, as depicted in FIG. 12.

While various devices, processes, applications and apparatus have been described herein, it should be appreciated that they are examples to facilitate understanding and should not be used to restrict the scope of disclosure. Where example operations are described herein, it should be appreciated that the operations are only examples to illustrate application of the composite information bearing devices and are not intended to limit scope of disclosure.

For example, while Fourier Transform, or more specifically discrete Fourier Transform has been used as an example scheme of steganographic encoding, other transformation functions, also known as transform domain functions, for example, Bessel Transform, Cosine Transform and their discrete counterparts, which are capable of transforming data components covertly into image defining elements, can also be used.

For example, while some the example have been described with reference to linear combination of a data portion recovered from the image pattern and a data portion on the human readable device to form an identification code for further processing, it should be appreciated that other processes, for example, by other mathematical operations may be applied without loss of generality.

Furthermore, while a plurality of data components is embedded in an image pattern of the information bearing device, a selected plurality of the data components may be selected to form a data portion to be recovered by machine processing to facilitate authentication or verification of authenticity without loss of generality.

In generally, some of the data components defining the spatial distribution properties of the image defining elements may have a spatial frequency higher than that of a high-fidelity commercial photocopier to mitigate risks of copying, since data properties may easily lose during copying if higher spatial frequencies are used to define distribution of the image defining elements of the image pattern.

Example human readable devices and example machine encoded image patterns have been provided herein to assist understanding of the disclosure and such examples are not intended to limit the scope of disclosure.

The invention claimed is:

1. A composite information bearing device comprising a set of human readable symbols and an image pattern which are present on the device,
   wherein the set of human readable symbols comprises a first data portion and a second data portion, the human readable symbols being readily readable from a surface of the device without machine reading;
   wherein the image pattern comprises a data-encoded image pattern, the data-encoded image pattern being encoded with a third data portion;
   wherein one of the first data portion or the second data portion is configured to combine, operate or concatenate with said third data portion to form an identification code;
   wherein the other one of the first or said second data portions not forming part of said identification code is a verification code; and
   wherein the identification code and the verification code cooperate to define a set of security features to facilitate machine-based verification of authenticity of information carried by the composite information bearing device.

2. The composite information bearing device according to claim 1, wherein said image pattern comprises a data encoded area which is formed by a scheme of digital steganography operating on the third data portion to form a covertly coded data embedding image pattern, said scheme of steganography being operable to encode said third data portion covertly by transforming said third data portion into a plurality of image defining elements, wherein said image defining elements are distributed in a scrambled manner to collectively define the entirety of said image pattern and no definitive or visually discernable boundary between adjacent image defining elements is identifiable, and an individual image defining element carries no decodable data value.

3. The composite information bearing device according to claim 2, wherein said image pattern is related to said third data portion by a scheme of transform domain operation, said transform domain operation includes transform operation using Fourier Transform, Cosine Transform, Bessel Transform, or other transform domain techniques that are operable to transform a data point in one domain into a plurality of image defining elements to collectively define said image pattern in spatial domain; and wherein the image defining elements are spatially distributed according to spatial distribution rules characteristic of the scheme of transform domain operation, and the image defining elements are distributed to comprises spatial frequency contents higher than a spatial frequency threshold, wherein the spatial frequency threshold corresponds to the maximum spatial resolution limit of a naked eye or a commercial photocopier suitable for high-fidelity document reproduction.

4. The composite information bearing device according to claim 2, wherein said image pattern is represented or representable by a plurality of N×M image defining elements, N and M being natural numbers; and wherein said third data portion is recoverable by reversal operation of the scheme of digital steganography such as a scheme of transform domain operation on the image pattern.

5. The composite information bearing device according to claim 2, wherein said third data portion is represented or is representable by a string of n binary data bits, and said image pattern is one of $2^n$ possible variations.

6. The composite information bearing device according to claim 5, wherein said n binary data bits are presentable in a non-spatial domain plane upon reversal operation of a scheme of steganography operation that was used to encode said third data portion.

7. The composite information bearing device according to claim 2, wherein the other one of said first or said second data portions not forming part of said identification code is to define said verification code for verifying said identification code, and said verification code has a shorter data length than said identification code.

8. The composite information bearing device according to claim 2, wherein said human readable data device comprises a string of alphanumeric data symbols, and said scheme of operation includes a scheme of mathematical operation or a scheme of computational operation such as hashing through the use of a hash map.

9. The composite information bearing device according to claim 2, wherein the first set of data comprises a string of alphanumeric data symbols separable into said first data portion and said second data portion, wherein said first data portion forms part of said identification code and said second data portion forms said verification code such as a check code, check digit or check sum.

10. The composite information bearing device according to claim 2, wherein said human readable data device is superimposed on said image defining elements of image pattern, and superimposed human readable data device is human readable or readable by optical character recognition.

11. The composite information bearing device according to claim 2, further comprising an alignment guide, wherein said alignment guide comprises positional and/or dimensional alignment devices that are arranged to facilitate complementary positional and/or dimensional alignment with a counterpart alignment guide on an image viewer of an image capturing apparatus, and/or the alignment devices are distributed around a periphery said image pattern.

12. The composite information bearing device according to claim 2, wherein the composite information bearing device is formed on an identification device which is part of an article or is attached to a living object and comprises a plurality of coded image patterns and a plurality of human readable data devices; wherein the coded image patterns are the same and each of the human readable data devices is unique or distinctive to provide individual identification.

13. The composite information bearing device according to claim 12, wherein the first and/or second data portions of the human readable data devices are arranged in a serial or sequential order.

14. A method of machine verification of authenticity of an information bearing device, the information bearing device comprising a set of human readable symbols and an image pattern which are present on the device, wherein the set of human readable symbols comprises a first data portion and a second data portion, the human readable symbols being readily readable from a surface of the device without machine reading; wherein the image pattern comprises a data-encoded image pattern, the data-encoded image pattern being encoded with a third data portion by a scheme of data encoding operation; wherein one of the first data portion or the second data portion is configured to combine, operate or concatenate with said third data portion to form an identification code; wherein the other one of the first or said second data portions not forming part of said identification code is a verification code; and wherein the identification code and the verification code cooperate to define a set of security features to facilitate machine-based verification of authenticity of information carried by the composite information bearing device; wherein the method comprises:—
 a. obtaining an image of said composite information bearing device by an image capture device;
 b. processing said image by a machine to recover said third data portion by reversing the scheme of data encoding operation, wherein said third data portion comprises a plurality of data components and the data components are covertly embedded in said image pattern, wherein the data components are arranged in a sequence having a relative sequence order of the data components to form an ordered sequence and the sequence order is not explicit or perceivable from said image pattern, and wherein spatial properties of each data component are spread throughout the entire image pattern;
 c. selecting one of the first data portion or the second data portion to form an identification code with said third data portion with;
 d. selecting the other one of the first data portion or the second data portion which is not used to form an identification code as a verification code;
 e. determining relationship between said identification code and said verification code; and
 f. generating a decision of authenticity based on outcome of relationship determination.

15. The method according to claim 14, wherein said method comprises reading of said human readable data device or part thereof by optical recognition.

16. The method according to claim 15, wherein said method comprises user inputting said human readable data device or part thereof.

17. The method according to claim 15, wherein said method comprises a processor processing of said image pattern to obtain said second set of data.

18. An apparatus comprising an image acquisition device, data storage device, and a solid-state processor, wherein the processor is to execute stored instructions to operate said image acquisition device to capture an image of a target authentication device and to store said image in the data storage device for display on a display screen, wherein the authentication device comprises a human readable data device and an image pattern which are optically present on the authentication device, wherein the human readable data device comprises a set of human readable data symbols including a first data portion and a second data portion, the human readable symbols being readily readable from a surface of the authentication device without machine-operated reading; wherein the image pattern comprises a data-coded image pattern which is encoded with a third data portion by a scheme of data encoding operation; wherein one of said first data portion or said second data portion is configured to combine, operate or concatenate with said third data portion to form an identification code, and the other one of said first or said second data portions not forming part of said identification code is a verification code, wherein the identification code and the verification code cooperate to define a set of security features to facilitate machine-based verification of authenticity of information carried by the authentication device; said verification code being related to said identification code by a scheme of operation; wherein the processor is execute stored instructions:

- to process the image pattern to recover said third data portion by reversing the scheme of data encoding operation;
- to form an identification code by linear combination, concatenation or processing of one of said first data portion or said second data portion with said third data portion, wherein said third data portion comprises a plurality of data components, each data component having spatial properties spread throughout the image pattern; and wherein the data components are arranged in an order sequence, and order of the sequence is determined according by the stored instructions and not explicit or perceivable from the image pattern;
- to select the other one of said first data portion or said second data portion of said human readable data device which is not used to form an identification code as a verification code,
- by compare the identification code and the verification code to determine whether the identification code and the verification code are related by a predetermined scheme of operation, and
- to generate a decision of authenticity based on outcome of relationship determination.

19. The apparatus according to claim 18, wherein the apparatus includes a user input interface to input said first data portion or part thereof, and/or said second data portion or part thereof.

20. The apparatus according to claim 19, wherein the apparatus is to obtain said first set of data or part thereof by optical character recognition.

* * * * *